(12) United States Patent
Brown

(10) Patent No.: US 7,024,666 B1
(45) Date of Patent: Apr. 4, 2006

(54) MOTION CONTROL SYSTEMS AND METHODS

(75) Inventor: David W. Brown, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 127 days.

(21) Appl. No.: 10/353,604

(22) Filed: Jan. 28, 2003

Related U.S. Application Data

(60) Provisional application No. 60/352,302, filed on Jan. 28, 2002, provisional application No. 60/353,366, filed on Jan. 31, 2002.

(51) Int. Cl.
G06F 9/45 (2006.01)

(52) U.S. Cl. .......................... 717/137; 717/143; 704/2; 704/5; 700/56; 700/87; 700/246

(58) Field of Classification Search ................ 717/136, 717/137, 143; 709/201, 230; 704/2, 3, 5, 704/7–9; 703/25; 700/56, 67, 87, 245, 246
See application file for complete search history.

(56) References Cited

U.S. PATENT DOCUMENTS

| 4,159,417 | A |   | 6/1979  | Rubincam              |
|-----------|---|---|---------|-----------------------|
| 4,199,814 | A | * | 4/1980  | Rapp et al. ..... 700/180 |
| 4,418,381 | A |   | 11/1983 | Molusis et al.        |
| 4,531,182 | A |   | 7/1985  | Hyatt                 |
| 4,688,195 | A | * | 8/1987  | Thompson et al. ..... 706/11 |
| 4,713,808 | A |   | 12/1987 | Gaskill               |
| 4,767,334 | A |   | 8/1988  | Thorne et al.         |
| 4,769,771 | A |   | 9/1988  | Lippmann et al.       |
| 4,782,444 | A | * | 11/1988 | Munshi et al. ..... 717/153 |
| 4,800,521 | A |   | 1/1989  | Carter et al.         |
| 4,809,335 | A |   | 2/1989  | Rumsey                |
| 4,815,011 | A | * | 3/1989  | Mizuno et al. ..... 700/264 |
| 4,840,602 | A |   | 6/1989  | Rose                  |
| 4,846,693 | A |   | 7/1989  | Baer                  |

(Continued)

FOREIGN PATENT DOCUMENTS

EP 0442676 A2 8/1991

(Continued)

OTHER PUBLICATIONS

WOSA Backgrounder: Delivering Enterprise Services to the Windows-based Desktop, Jul. 1993, Microsoft Development Library; pp. 1-19.

(Continued)

Primary Examiner—Anthony Knight
Assistant Examiner—Crystal J. Barnes
(74) Attorney, Agent, or Firm—Michael R. Schacht; Schacht Law Office, Inc.

(57) ABSTRACT

A motion control system comprising a source application program, a target device, a parser, an emitter, a program engine, and a parser interface. The source application program is defined by a source language specification. The target device creates motion under control of application programs defined by a target language specification. The parser component contains logic for converting application programs defined by the source language specification into a generic format. An emitter component containing logic for converting application programs in the generic format into application programs defined by the target language specification. The program engine component directs the parser component to convert the source application program into a generic application program. The program engine component further directs the emitter component to convert the generic application program into a target application program defined by the target language specification. The parser interface defines communications between the parser component and the program engine component.

14 Claims, 9 Drawing Sheets

U.S. PATENT DOCUMENTS

| | | |
|---|---|---|
| 4,855,725 A | 8/1989 | Fernandez |
| 4,857,030 A | 8/1989 | Rose |
| 4,887,966 A | 12/1989 | Gellerman |
| 4,897,835 A | 1/1990 | Gaskill |
| 4,912,650 A * | 3/1990 | Tanaka et al. ............... 700/264 |
| 4,923,428 A | 5/1990 | Curran |
| 4,937,737 A | 6/1990 | Schwane et al. |
| 4,987,537 A | 1/1991 | Kawata |
| 5,005,135 A * | 4/1991 | Morser et al. ............... 700/193 |
| 5,020,021 A * | 5/1991 | Kaji et al. ..................... 704/5 |
| 5,095,445 A | 3/1992 | Sekiguchi |
| 5,120,065 A | 6/1992 | Driscoll et al. |
| 5,126,932 A | 6/1992 | Wolfson et al. |
| 5,168,441 A | 12/1992 | Onarheim et al. |
| 5,175,684 A * | 12/1992 | Chong ........................... 704/3 |
| 5,175,817 A | 12/1992 | Adams et al. |
| 5,175,856 A * | 12/1992 | Van Dyke et al. .......... 717/151 |
| 5,230,049 A * | 7/1993 | Chang et al. ............... 717/143 |
| 5,245,703 A | 9/1993 | Hubert |
| 5,247,650 A | 9/1993 | Judd et al. |
| 5,377,258 A | 12/1994 | Bro |
| 5,390,304 A | 2/1995 | Leach et al. |
| 5,390,330 A | 2/1995 | Talati |
| 5,392,207 A | 2/1995 | Wilson et al. |
| 5,402,518 A | 3/1995 | Lowery |
| 5,412,757 A | 5/1995 | Endo |
| 5,438,529 A | 8/1995 | Rosenberg et al. |
| 5,450,079 A | 9/1995 | Dunaway |
| 5,453,933 A | 9/1995 | Wright et al. |
| 5,465,215 A | 11/1995 | Strickland et al. |
| 5,491,813 A | 2/1996 | Bondy et al. |
| 5,493,281 A | 2/1996 | Owens |
| 5,511,147 A * | 4/1996 | Abdel-Malek ............... 700/264 |
| 5,541,838 A * | 7/1996 | Koyama et al. ............... 704/4 |
| 5,576,727 A | 11/1996 | Rosenberg et al. |
| 5,577,253 A * | 11/1996 | Blickstein ................... 717/156 |
| 5,596,994 A | 1/1997 | Bro |
| 5,600,373 A | 2/1997 | Chui et al. |
| 5,604,843 A | 2/1997 | Shaw et al. |
| 5,607,336 A | 3/1997 | Lebensfeld et al. |
| 5,608,894 A | 3/1997 | Kawakami et al. |
| 5,613,117 A * | 3/1997 | Davidson et al. ........... 717/144 |
| 5,617,528 A | 4/1997 | Stechmann et al. |
| 5,623,582 A | 4/1997 | Rosenberg |
| 5,625,821 A | 4/1997 | Record et al. |
| 5,636,994 A | 6/1997 | Tong |
| 5,652,866 A | 7/1997 | Aldred et al. |
| 5,655,945 A | 8/1997 | Jani |
| 5,659,753 A * | 8/1997 | Murphy et al. ............. 717/147 |
| 5,666,161 A | 9/1997 | Kohiyama et al. |
| 5,670,992 A | 9/1997 | Yasuhara et al. |
| 5,691,897 A | 11/1997 | Brown et al. |
| 5,691,898 A | 11/1997 | Rosenberg et al. |
| 5,701,140 A | 12/1997 | Rosenberg et al. |
| 5,707,289 A | 1/1998 | Watanabe et al. |
| 5,724,074 A | 3/1998 | Chainani et al. |
| 5,733,131 A | 3/1998 | Park |
| 5,734,373 A | 3/1998 | Rosenberg et al. |
| 5,737,523 A | 4/1998 | Callaghan et al. |
| 5,739,811 A | 4/1998 | Rosenberg et al. |
| 5,746,602 A | 5/1998 | Kikinis |
| 5,752,880 A | 5/1998 | Gabai et al. |
| 5,754,855 A | 5/1998 | Miller et al. |
| 5,764,155 A | 6/1998 | Kertesz et al. |
| 5,790,178 A | 8/1998 | Shibata et al. |
| 5,800,268 A | 9/1998 | Molnick |
| 5,801,946 A | 9/1998 | Nissen et al. |
| 5,805,785 A | 9/1998 | Dias et al. |
| 5,818,537 A | 10/1998 | Enokida et al. |
| 5,821,920 A | 10/1998 | Rosenberg et al. |
| 5,821,987 A | 10/1998 | Larson |
| 5,822,207 A | 10/1998 | Hazama et al. |
| 5,825,308 A | 10/1998 | Rosenberg |
| 5,828,575 A | 10/1998 | Sakai |
| 5,836,014 A * | 11/1998 | Faiman, Jr. ................. 717/156 |
| 5,846,132 A | 12/1998 | Junkin |
| 5,848,415 A | 12/1998 | Guck |
| 5,852,441 A | 12/1998 | Nakajima et al. |
| 5,855,483 A | 1/1999 | Collins et al. |
| 5,867,385 A | 2/1999 | Brown et al. |
| 5,873,765 A | 2/1999 | Rifkin et al. |
| 5,889,670 A | 3/1999 | Schuler et al. |
| 5,889,672 A | 3/1999 | Schuler et al. |
| 5,890,963 A | 4/1999 | Yen |
| 5,907,704 A | 5/1999 | Gudmundson et al. |
| 5,907,831 A | 5/1999 | Lotvin et al. |
| 5,914,876 A | 6/1999 | Hirai |
| 5,920,476 A | 7/1999 | Hennessey et al. |
| 5,924,013 A | 7/1999 | Guido et al. |
| 5,956,484 A | 9/1999 | Rosenberg et al. |
| 5,959,613 A | 9/1999 | Rosenberg et al. |
| 5,960,085 A | 9/1999 | De La Huerga |
| 5,977,951 A | 11/1999 | Danieli et al. |
| 6,012,961 A | 1/2000 | Sharpe et al. |
| 6,020,876 A | 2/2000 | Rosenberg et al. |
| 6,028,593 A | 2/2000 | Rosenberg et al. |
| 6,031,973 A | 2/2000 | Gomi et al. |
| 6,038,603 A | 3/2000 | Joseph |
| 6,046,727 A | 4/2000 | Rosenberg et al. |
| 6,057,828 A | 5/2000 | Rosenberg et al. |
| 6,061,004 A | 5/2000 | Rosenberg |
| 6,070,010 A * | 5/2000 | Keenleyside et al. ........ 717/154 |
| 6,078,308 A | 6/2000 | Rosenberg et al. |
| 6,078,968 A | 6/2000 | Lo et al. |
| 6,083,104 A | 7/2000 | Choi |
| 6,090,156 A * | 7/2000 | MacLeod ..................... 717/157 |
| 6,100,874 A | 8/2000 | Schena et al. |
| 6,101,425 A | 8/2000 | Govindaraj et al. |
| 6,101,530 A | 8/2000 | Rosenberg et al. |
| 6,104,158 A | 8/2000 | Jacobus et al. |
| 6,125,385 A | 9/2000 | Wies et al. |
| 6,128,006 A | 10/2000 | Rosenberg et al. |
| 6,131,097 A | 10/2000 | Peurach et al. |
| 6,139,177 A | 10/2000 | Venkatraman et al. |
| 6,144,895 A | 11/2000 | Govindaraj et al. |
| 6,147,647 A | 11/2000 | Tassoudji et al. |
| 6,161,126 A | 12/2000 | Wies et al. |
| 6,166,723 A | 12/2000 | Schena et al. |
| 6,169,540 B1 | 1/2001 | Rosenberg et al. |
| 6,173,316 B1 | 1/2001 | De Boor et al. |
| 6,191,774 B1 | 2/2001 | Schena et al. |
| 6,195,592 B1 | 2/2001 | Schuler et al. |
| 6,209,037 B1 | 3/2001 | Brown et al. |
| 6,216,173 B1 | 4/2001 | Jones et al. |
| 6,219,032 B1 | 4/2001 | Rosenberg et al. |
| 6,219,033 B1 | 4/2001 | Rosenberg et al. |
| 6,232,891 B1 | 5/2001 | Rosenberg |
| 6,233,545 B1* | 5/2001 | Datig ............................ 704/2 |
| 6,243,078 B1 | 6/2001 | Rosenberg |
| 6,246,390 B1 | 6/2001 | Rosenberg |
| 6,252,579 B1 | 6/2001 | Rosenberg et al. |
| 6,252,853 B1 | 6/2001 | Ohno |
| 6,259,382 B1 | 7/2001 | Rosenberg |
| 6,271,833 B1 | 8/2001 | Rosenberg et al. |
| 6,278,439 B1 | 8/2001 | Rosenberg et al. |
| 6,285,351 B1 | 9/2001 | Chang et al. |
| 6,286,133 B1* | 9/2001 | Hopkins ..................... 717/143 |
| 6,288,705 B1 | 9/2001 | Rosenberg et al. |
| 6,288,716 B1 | 9/2001 | Humpleman |
| 6,290,565 B1 | 9/2001 | Galyean, III et al. |
| 6,292,170 B1 | 9/2001 | Chang et al. |
| 6,292,174 B1 | 9/2001 | Mallett et al. |
| 6,292,712 B1 | 9/2001 | Bullen |
| 6,292,714 B1 | 9/2001 | Okabayashi |

| | | | |
|---|---|---|---|
| 6,295,530 B1 | 9/2001 | Ritchie et al. | |
| 6,300,936 B1 | 10/2001 | Braun et al. | |
| 6,300,937 B1 | 10/2001 | Rosenberg | |
| 6,301,634 B1 | 10/2001 | Gomi et al. | |
| 6,304,091 B1 | 10/2001 | Shahoian et al. | |
| 6,305,011 B1 * | 10/2001 | Safonov | 717/114 |
| 6,309,275 B1 | 10/2001 | Fong et al. | |
| 6,310,605 B1 | 10/2001 | Rosenberg | |
| 6,317,116 B1 | 11/2001 | Rosenberg et al. | |
| 6,317,871 B1 * | 11/2001 | Andrews et al. | 717/137 |
| 6,343,349 B1 | 1/2002 | Braun et al. | |
| 6,353,850 B1 | 3/2002 | Wies et al. | |
| 6,366,272 B1 | 4/2002 | Rosenberg et al. | |
| 6,366,273 B1 | 4/2002 | Rosenberg et al. | |
| 6,374,255 B1 | 4/2002 | Peurach et al. | |
| 6,400,996 B1 | 6/2002 | Hoffberg et al. | |
| 6,401,005 B1 | 6/2002 | Schwarz et al. | |
| 6,425,118 B1 * | 7/2002 | Molloy et al. | 717/136 |
| 6,442,451 B1 | 8/2002 | Lapham | |
| 6,463,404 B1 * | 10/2002 | Appleby | 704/9 |
| 6,470,377 B1 | 10/2002 | Sevcik et al. | |
| 6,480,896 B1 | 11/2002 | Brown et al. | |
| 6,497,606 B1 | 12/2002 | Fong et al. | |
| 6,519,594 B1 | 2/2003 | Li | |
| 6,519,646 B1 | 2/2003 | Gupta et al. | |
| 6,523,171 B1 * | 2/2003 | Dupuy et al. | 717/136 |
| 6,528,963 B1 * | 3/2003 | Hong | 318/568.18 |
| 6,571,141 B1 | 5/2003 | Brown | |
| 6,652,378 B1 | 11/2003 | Cannon et al. | |
| 6,658,627 B1 * | 12/2003 | Gallup et al. | 715/536 |
| 6,662,361 B1 * | 12/2003 | Jackson | 717/136 |
| 6,665,688 B1 * | 12/2003 | Callahan et al. | 707/200 |
| 6,678,713 B1 | 1/2004 | Mason et al. | |
| 6,778,949 B1 * | 8/2004 | Duan et al. | 704/2 |
| 2001/0020944 A1 | 9/2001 | Brown et al. | |
| 2001/0029443 A1 * | 10/2001 | Miyahira | |
| 2001/0032268 A1 | 10/2001 | Brown et al. | |
| 2001/0037492 A1 * | 11/2001 | Holzmann | |
| 2002/0052939 A1 | 5/2002 | Lee | |
| 2002/0165627 A1 | 11/2002 | Brown et al. | |
| 2002/0165708 A1 * | 11/2002 | Kumhyr | |
| 2002/0177453 A1 | 11/2002 | Chen et al. | |
| 2003/0033150 A1 * | 2/2003 | Balan et al. | |
| 2003/0061023 A1 * | 3/2003 | Menezes et al. | |
| 2004/0025150 A1 * | 2/2004 | Heishi et al. | |
| 2004/0044794 A1 * | 3/2004 | Srinivasan | |

FOREIGN PATENT DOCUMENTS

| | | |
|---|---|---|
| EP | 0 281 427 B1 | 8/1992 |
| EP | 0508912 A1 | 10/1992 |
| EP | 0 583 908 A2 | 2/1994 |
| EP | 821522 A2 | 1/1998 |
| EP | 0275826 A1 | 7/1998 |
| GB | 2 224 896 A | 12/1991 |
| JP | 59 228473 | 6/1983 |
| JP | 08161335 A * | 6/1996 |
| JP | 2000020114 A * | 1/2000 |
| WO | WO 92/11731 | 7/1992 |
| WO | WO 93/08654 | 4/1993 |
| WO | WO 95/07504 | 3/1995 |

OTHER PUBLICATIONS

WOSA Inside Windows 95; pp. 348-351.
Software Products for Industrial Automation, ICONICS, Inc.; 1993; 6 pages.
WEB 3.0 Product Brochure, Trihedral Engineering Ltd. (1994); 6 pages.
The Complete, Computer-Based Automation Tool (IGSS) Seven Technologies A/S; 6 pages.
Oregon Micro Systems, Inc.; Precision Motion Controls Product Guide: pp. 1-20.
AIMAX-WIN Product Brochure, TA Engineering Co., Inc.; 1993; 8 pages.
XANALOG Model NL-SIM Product Brochure, XANALOG, 1994; 4 pages.
ExperTune PID Tuning Software, Gerry Engineering Software; 1993; 6 pages.
PMAC Product Catalog, 1992; p. 43.
Paragon TNT Product Brochure, Intec Controls Corp.; 6 pages.
Aerotech Motion Control Product Guide; pp. 233-234.
OpenBatch Product Brief, PID, Inc.; 1994; 6 pages.
PC/DSP-Series Motion Controller C Programming Guide; 1992; pp. 1-54.
FIX Product Brochure, Intellution (1994); 6 pages.
Compumotor Digiplan (1993-94) Catalog pp. 10-11.
Sue Chen Jonathon Lin; *Computer Numerical Control: Essentials in Programming and Networking*; Part V, Chapter 27; 1994; pp. 824-848; Delmar Publishers, Inc.; U.S.
Pritschow et al.; "Open System Controllers: Challenge for the Future of the Machine Tool Industry"; pub. Jan. 15, 1993; pp. 449-452.
William E. Ford; "What Is an Open Architecture Robot Controller" pub. Aug. 16, 1994; pp. 27-32.
Marcos et al.; "A New Solution for Integrating Control Devices Involved in Computer-Integrated Manufacturing"; pub. Sep. 2, 1996; pp. 485-490.
Chu and Wang; "Development of a Practical SFC System for CNC Machine Shop"; pub. 1994; pp. 362-367.
MICROSOFT; "The Microsoft Object Technology Strategy"; pub. Mar. 1994; pp. 1-33.
MICROSOFT; "Open Systems: Technology, Leadership, and Collaboration"; pub. Mar. 1994; pp. 1-15.
MICROSOFT; Microsoft OLE Today and Tomorrow: Technology Overview; pub. Dec. 1993; pp. 1-9.
MICROSOFT; "Object Linking and Embedding 2.0 Backgrounder"; pub. Sep. 1993; pp. 1-15.
Robert Anderson; "SMART: A Modular Architecture for Robotics and Teleoperation"; pub. 1993; pp. 416-421.
Proctor et al.; "Validation of Standard Interfaces for Machine Control"; pub. 1996; pp. 659-664.
Altintas et al.; "Design and Analysis of a Modular CNC System"; pub. Mar. 4, 1990; pp. 305-316.
Wright et al.; "Open Architecture Manufacturing: The Impact of Open-System Computers on Self-sustaining Machinery and the Machine Tool Industry"; pp. 41-47.
Protoctor et al.; "Open Architecture Controllers"; pub. Jun. 1997; pp. 60-64.
Lutz et al.; "OSACA-The Vendor-Neutral Control Architecture"; pub. Dec. 1997; pp. 247-256.
Morales et al.; "A Generalised Software Control System for Industrial Robots"; pub. 1998; pp. 411-416.
Feng et al.; "Distributed Control of a Multiple-Tethered Mobile Robot System for Highway Maintenance and Construction"; pub Nov. 1997; pp. 383-392.
Fedrowitz; IRL-Based Expansion of the Commonly Used High-Level Language C for Robot Programming: pub. Oct. 1995; 5 pages.
Szabo et al.; "Validation Results of Specifications for Motion Control Interoperability"; pub. Sep. 1997; pp. 166-176.
Chang et al.; "Development and Implementation of an Application Programming Interface for PC/DSP-based Motion Control System"; pub. 1998; pp. 94-105.
Erol et al.; "Open System Architecture Modular Tool Kit for Motion and Machining Process Control"; pub. Sep. 2000; pp. 281-291.

Mizukawa et al.; "OriN: Open Robot-Interface for the Network: A Proposed Standard"; pub. May 2000; pp. 344-350.
Michaloski et al.; "A Framework for Component-base CNC Machines" pub. Nov. 1998; pp. 132-143.
Bouzouia et al.; "A Three-layer Workcell Control Architecture Design"; pub. May 1998; pp. 1185-1191.
Morales et al.; "GENERIS: The EC-JRC Generalized Software Control System for Industrial Robots"; pub. 1999; pp. 26-33.
Muir et al.; "Mechatronic Objects for Real-time Control Software Development"; pub. Nov. 1998; pp. 251-265.
Cho et al.; "A Compact/Open Network-based Controller Incorporating Modular Software Architecture for a Humanoid Robot"; pub. 1999; pp. 341-355.
Ge et al.; "A One-stop Solution in Robotic Control System Design"; pub. Sep. 2000; pp. 42-55.
McGraw et al.; "A Friendly Command, Control, and Information System for Astronomy"; pub. 1996; pp. 356-367.
Jackman; "Robotic Control Using Sequential Function Charts"; pub. 1996; pp. 120-128.
Mizukawa et al.; "De-facto Standard API for Open and Networked Industrial Robots"; pub. Oct. 1999; pp. 455-462.
Leu et al.; "A Telemanufacturing Workcell over the Internet"; pub. Nov. 1998; pp. 230-237.
Natale et al.; "Robust Hybrid Force/Position Control with Experiments on an Industrial Robot"; pub. Sep. 19, 1999; pp. 956-961.
Nilsson et al.; "Integrated Architecture for Industrial Robot Programming and Control"; pub. Dec. 31, 1999; pp. 205-226.
Valera et al.; "Interactive Online Evaluation of Robot Motion Control"; pub. Aug. 22, 1999; pp. 1039-1043.
"NEMI Low-cost Controller Project"; pub. Dec. 1996; total pp. 392.
Sperling; "Designing Applications for an OSACA Control"; pub. Nov. 16, 1997; 5 pages.
Sperling et al.; "Enabling Open Control Systems: An Introduction to the OSACA System Platform"; pub. May 1996; pp. 1-8.
OMAC Requirements Document; "Requirements of Open Modular Architecture Controllers for Applications in the Automotive Industry"; pub. Dec. 13, 1994; pp. 1-13.
GM Powertrain Group Manufacturing Engineering Controls Council; "Open, Modular Architecture Controls at GM Powertrain"; pub. May 14, 1996; pp. 1-33.
TEAM ICLP API Working Group; "Technologies Enabling Agile Manufacturing (TEAM) Intelligent Closed Loop Processing"; pub. Jan. 11, 1996; 30 pages.
Bradley Bargen and Peter Donnely; *Inside Direct X—In Depth Techniques for Developing High-Performance Multimedia Applications*; 1988; Chps. 1, 18-20, 22-27; Microsoft Press; U.S.
Peter Kovach; *Inside Direct3D—The Definitive Guide for Real-Time 3D Power and Performance for Microsoft Windows*; 2000; Chps. 1, 7, 15; Microsoft Press; U.S.
M. Farsi and M. Barbosa; *CANopen Implementation—Application to Industrial Networks*; 2000; Chps. 1, 2 and 3; Research Studies Press Ltd.; England and U.S.
Wolfhard Lawrenz; *CAN System Engineering—From Theory to Practical Applications*; 1997; Chps. 1, 2.1, 2.2, 3.2 and 4.1; Springer-Verlag New York, Inc.; U.S.
Allen-Bradley; "CNCnet Software Library"; Oct., 1992; Publication 8000-6.1.1; U.S.
Robert Bosch GmbH; "CAN Specification"; Sep., 1991; Version 2.0.
SISCO, Inc.; "Overview and Introduction to the Manufacturing Message Specification (MMS)"; 1994-1995; Revision 2; Systems Integration Specialists Company, Inc.; Sterling Heights, Michigan, U.S.
ISO-9506-1 "Industrial Automation Systems—Manufacturing Message Specification—Part 1: Service definition"; Aug., 2000; pp. i-22; ISO/IEC; Switzerland.
ISO-9506-2 "Industrial Automation Systems—Manufacturing Message Specification—Part 2: Protocol specification"; Aug. 2000; pp. i.-6; ISO/IEC; Switzerland.
SISCO, Inc.; "MMS-EASE"; Jan. 1996; Systems Integration Specialists Company, Inc.; Sterling Heights, Michigan, U.S.
ANSI/EIA-484-A "Electrical and Mechanical Interface Characteristics and Line Control Protocol Using Communication Control Characters for Serial Data Link Between a Direct Numerical Control System and Numerical Control Equipment Employing Asynchronous Full Duplex Transmission"; Jun., 1995; Electronic Industries Association; U.S.
ISO/IEC 7498-1 "Information Technology—Open Systems Interconnection-Basic Reference Model: The Basic Model"; Nov. 1994; U.S.
ISO/IEC 7498-3 "Information Technology—Open Systems Interconnection-Basic Reference Model: Naming and Addressing"; Apr. 1997; U.S.
Todd J. Schuett; "The Benefits and Data Bottlenecks of High Speed Milling"; Aug., 1995; conference paper presented at Southeastern Michigan Chapter American Mold Builders Association; Creative Technology Corporation; U.S.
Todd J. Schuett; "The Ultimate DNC; Direct CNC Networking (DCN)"; *Modern Machine Shop*; Jan., 1996; Creative Technology Corporation; U.S.
Todd J. Schuett; "Advanced Controls for High Speed Milling"; conference paper presented at the SME "High Speed Machining" conference; May 7-8, 1996; Creative Technology Corporation; U.S.
Leitao, Machado & Lopes; "A Manufacturing Cell Integration Solution"; paper developed at CCP as a part of the ESPRIT 5629 Project; Oct., 1995.
Mitsubishi Electric; *Mitsubishi Electric Advance: Programmable Logic Controllers Edition*; Sep., 1996; vol. 76; Mitsubishi Electric Corporation; Tokyo.
Farsi, M.; "Flexible and Reliable Robotics Cells in Factory Automation"; 1993; pp. 520-525.
Chu & Wang; "Development of a Practical SFC System for CNC Machine Shop"; *International Conference on Data and Knowledge Systems for Manufacturing and Engineering*; May 1994; pp. 362-367, vol. 1; pp. xx+745, vol. 2.; Chinese Univ.; Hong Kong.
Farsi, M.; "Device Communication for Flexible Manufacturing:-A New Concept"; 1994; pp. 328-334.
Farsi, M.; "A Production Cell Communication Model in Factory Automation Using the Controller Area Network"; 1995; pp. 90-95.
Farsi, M. "CANopen: The Open Communications Solution"; 1996; pp. 112-116.
Katayama et al.; "A Motion Control System with Event-driven Motion-module Switching Mechanism for Robotic Manipulators"; *IEEE International Workshop on Robot and Human Communication*; Jul., 1993; pp. 320-325; U.S.

Matsui et al.; "An Event-Driven Architecture for Controlling Behaviors of the Office Conversant Mobile Robot, Jijo-2"; *Proceedings of the 1997 IEEE International Conference on Robotics and Automation*; Apr. 1997; pp. 3367-3372; U.S.
Microsoft Corporation; "How to Write and Use ActiveX Controls for Microsoft Windows CE 3.0"; *Windows CE 3.0 Technical Articles*; Jun., 2000; pp. 1-5.
Microsoft Corporation; "Notes on Implementing an OLE Control Container"; *ActiveX Controls Technical Articles*; Sep. 21, 1994; pp. 1-47.
Microsoft Corporation; "What OLE Is Really About"; *OLE (General) Technical Articles*; Jul., 1996; pp. 1-33.
Micorsoft Corporation; "Categorizing by Component Capabilities"; *Platform SDK: COM*; Nov., 2001; pp. 1-23.
Microsoft Corporation; "Dynamic Data Exchange"; *Windows 3.1 SDK Guide to Programming*; 1992, 1993; Chapter 22; 21 pages.
Microsoft Corporation; "Dynamic Data Exchange Management Library"; *Win32 SDK: Prog. Ref.* vol. 2: 1992, 1993; Chapter 77; 26 pages.
Microsoft Corporation; "Network Dynamic Data Exchange"; *Windows for Workgroups 3.1 Resource Kit*: 1992, 1993; Chapter 11; 19 pages.

* cited by examiner

MOTION CONTROL SYSTEMS AND METHODS

RELATED APPLICATIONS

This application claims priority of U.S. Provisional Application Ser. No. 60/352,302 filed Jan. 28, 2002, which is incorporated herein by reference, and U.S. Provisional Application Ser. No. 60/353,366 filed Jan. 31, 2002, which is also incorporated herein by reference.

TECHNICAL FIELD

The present invention relates to motion control systems and, more particularly, to a software system that facilitates the creation of motion control commands.

BACKGROUND OF THE INVENTION

The purpose of a motion control device is to move an object in a desired manner. The basic components of a motion control device are a controller and a mechanical system. The controller controls the mechanical system to move in a desired manner based on an application program comprising a sequence of instructions. While the mechanical system commonly comprises a drive and an electrical motor, other systems can be used to cause movement of an object based on a control signal. Additionally, it is possible for a motion control device to comprise a plurality of drives and motors to allow multi-axis control of the movement of the object.

Motion control devices are typically classified as general motion devices or computer numeric control (CNC) devices. General motion devices are general-purpose machines typically characterized by low cost controllers. CNC devices are relatively specialized, high level systems employing a high cost controller. The term "motion control system" will be used in the following discussion to refer to any system employing one or both of a general motion device and a CNC device. A motion control system is often used in conjunction with a host computer or programmable logic controller (PLC). The host computer or PLC allows the use of a high-level programming language to generate control commands that are passed to the controller. Application programs may be stored at various locations in a motion control system, including directly on the controller of a target device such as a general motion device or CNC device.

The present invention is of particular importance in the context of a motion control system in which multiple programming languages and language variants are used. Companies that manufacture motion control devices are, traditionally, hardware oriented companies that manufacture software dedicated to the hardware that they manufacture. These software products may be referred to as low-level programs. Low-level programs usually work directly with the motion control command language specific to a given motion control device. While such low-level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

The present invention also optionally has more specific application to an environment in which a general motion device is used to implement an application program written for a CNC device. The principles of the present invention are, however, generally applicable to any target motion control device that generates movement based on an application program.

A typical motion control system created for a particular task may use one or more application programs written in any number of different programming languages. The need thus exists for systems and methods that facilitate the generation of motion control commands in a multi-language environment. In addition, because of the relatively low cost of controllers for general motion devices, the need exists for systems and methods that convert programs written for CNC devices into control commands for general motion devices.

PRIOR ART

A number of software programs currently exist for programming individual motion control devices or for aiding in the development of systems containing a number of motion control devices.

The following is a list of documents disclosing presently commercially available high-level software programs: (a) Software Products For Industrial Automation, iconics 1993; (b) The complete, computer-based automation tool (IGSS), Seven Technologies A/S; (c) OpenBatch Product Brief, PID, Inc.; (d) FIX Product Brochure, Intellution (1994); (e) Paragon TNT Product Brochure, Intec Controls Corp.; (f) WEB 3.0 Product Brochure, Trihedral Engineering Ltd. (1994); and (g) AIMAX-WIN Product Brochure, TA Engineering Co., Inc. The following documents disclose simulation software: (a) ExperTune PID Tuning Software, Gerry Engineering Software; and (b) XANALOG Model NL-SIM Product Brochure, XANALOG.

The following list identifies documents related to low-level programs: (a) Compumotor Digiplan 1993–94 catalog, pages 10–11; (b) Aerotech Motion Control Product Guide, pages 233–34; (c) PMAC Product Catalog, page 43; (d) PC/DSP-Series Motion Controller C Programming Guide, pages 1–3; (e) Oregon Micro Systems Product Guide, page 17; (f) Precision Microcontrol Product Guide.

The Applicants are also aware of a software model referred to as WOSA that has been defined by Microsoft for use in the Windows programming environment. The WOSA model is discussed in the book Inside Windows 95, on pages 348–351. WOSA is also discussed in the paper entitled WOSA Backgrounder: Delivering Enterprise Services to the Windows-based Desktop. The WOSA model isolates application programmers from the complexities of programming to different service providers by providing an API layer that is independent of an underlying hardware or service and an SPI layer that is hardware independent but service dependent. The WOSA model has no relation to motion control devices.

The Applicants are also aware of the common programming practice in which drivers are provided for hardware such as printers or the like; an application program such as a word processor allows a user to select a driver associated with a given printer to allow the application program to print on that given printer.

While this approach does isolate the application programmer from the complexities of programming to each hardware configuration in existence, this approach does not provide the application programmer with the ability to control the hardware in base incremental steps. In the printer example, an application programmer will not be able to control each stepper motor in the printer using the provided printer driver; instead, the printer driver will control a number of stepper motors in the printer in a predetermined sequence as necessary to implement a group of high level commands.

The software driver model currently used for printers and the like is thus not applicable to the development of a sequence of control commands for motion control devices.

The Applicants are additionally aware of application programming interface security schemes that are used in general programming to limit access by high-level programmers to certain programming variables. For example, Microsoft Corporation's Win32 programming environment implements such a security scheme. To the Applicants' knowledge, however, no such security scheme has ever been employed in programming systems designed to generate software for use in motion control systems.

SUMMARY OF THE INVENTION

The present invention is a motion control system comprising a source application program, a target device, a parser component, an emitter component, and a program engine component. The source application program is defined by a source language specification. The target device creates motion under control of application programs defined by a target language specification. The parser component contains logic for parsing application programs defined by the source language specification. The emitter component contains logic for translating application programs defined by the source language specification into application programs defined by the target language specification. The program engine component sends at least a portion of a source application program to the parser component to be parsed into a parsed application. The program engine component then sends the parsed application to the emitter component to be translated into a target application defined by the second language specification. The program engine then sends the target application either directly or indirectly to the target device.

DETAILED DESCRIPTION OF THE INVENTION

Figure 1:
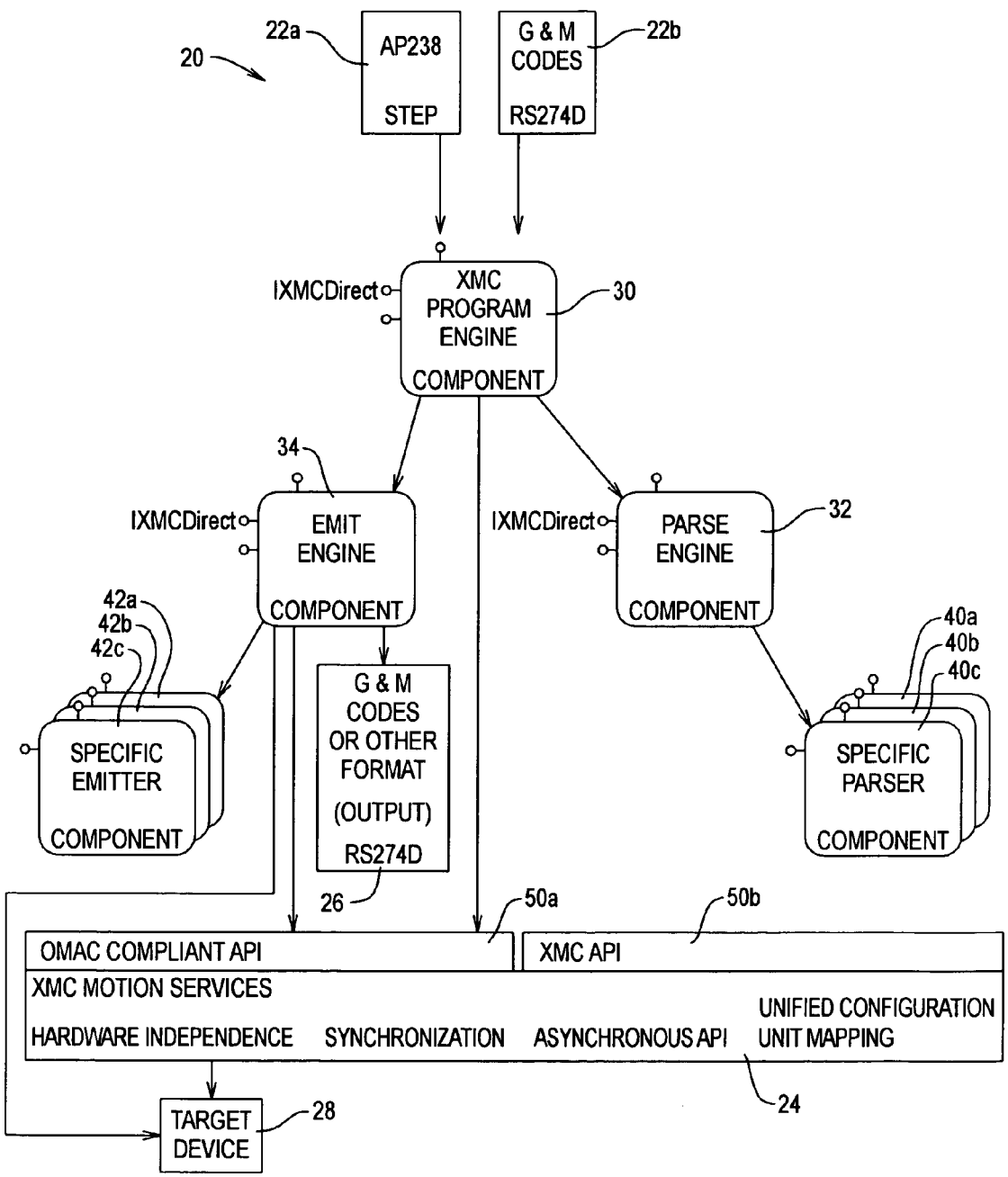
FIG. 1 is a module interaction map of an exemplary software translator system constructed in accordance with the principles of the present invention.

Referring initially to FIG. 1, depicted therein is a translation system 20 constructed in accordance with, and embodying, the principles of the present invention. The translation system 20 generates commands based on one or more application programs 22 written in one or more source languages. The commands may be sent in real time to a motion device (not shown) but will more typically be sent to a motion services module 24 and/or stored in a command file 26 for use at a later time.

The translation system 20 comprises a program engine 30, a parse engine 32, and an emit engine 34. Generally speaking, the parse engine 32 parses a source application program to obtain a parsed program, and the emit engine 34 converts the parsed program into a target program comprising one or more target commands. The commands may be machine specific but are more likely to conform to one or more hardware independent application programming interfaces (APIs) associated with the motion services module 24. In either case, the target application program conforms to a different language specification than the source application program. The target program is then sent either directly or indirectly to a target device 28.

All logic for translating a source application program to a target application program may be included in one or more parser components 40 and emitter components 42. Preferably, however, the parse engine 32 and emit engine 34 contain logic that is universal to the conversion of all source languages, while the parser components 40 and emitter components 42 contain only the logic required to perform the parsing and converting operations for a particular language. As new languages are developed or adopted, new parser components 40 and emitter components 42 may be developed and "plugged into" the parse engine 32 and the emit engine 34.

The motion services module 24 is or may be conventional and will be described herein only to the extent necessary for a complete understanding of the present invention. The motion services module 24 defines at least one and typically a plurality of APIs 50. As generally described above, the target commands conform to one or more of the APIs 50. For example, a first API 50a represents a standardized API to which hardware manufacturers may conform when designing motion control devices. A second API 50b represents a proprietary API as described, for example, in U.S. Pat. Nos. 5,691,897, 5,867,385, and 6,209,037. As discussed above, the motion services module 24 is not required in all of the scenarios in which the translation system 20 may be used and implemented.

The details of construction and operation of the translation system 20 will now be described in further detail.

The program engine 30 is designed to run any type of ASCII based application program regardless of its internal format. To do this, the program engine 30 uses the parser component 40 and emitter components 42 to understand (and optionally export) any application program written in a supported source language. The motion services module 24 is then used to run any target programs in an online or offline manner. When run in an online mode, motions occur immediately as the program is run; when running in an offline mode, the command file 26 is generated based on whatever target is in use by the motion services module 24.

The program engine 30, parse engine 32, and emit engine 34 work together to run programs in an online, offline or translated manner. Clients of the motion services module 24 can select or pre-configure the mode for which the program engine 30 runs when processing a source program.

The program engine 30 component is the main component used by the client. The program engine 30 coordinates all other components to carry out tasks necessary to process a given application program file. STEP, RS274D or other program files (ASCII or Binary) are example program file formats that may be passed to the program engine 30 for processing.

The parse engine 32 is responsible for managing all specific data parser component 40. A primary purpose of the exemplary parse engine 32 is to provide a universal base of functionality within the parse engine 32. Each specific parser component 40 may be as slim and simple as possible to create. As described above, a separate parse engine 32 and parser component 40 is not mandatory; however if the parse engine 32 is not used, the parser component 40 must then implement all parse functionality, including the universal base functionality that would otherwise be provided in the parse engine 32.

The parser components 40 are responsible for parsing the contents of the data format that the parser component 40 understands. For example, a standard EIA-274 parser component 40 would be expected to parse all standard EIA-274 based programs, whereas GE Fanuc G&M Code specific parser component 40 would be expected to parse a GE Fanuc G&M Code variant of the EIA-274 language (or other G&M code language). On another extreme, a STEP-238 parser component 40 would be expected to parse STEP-238 programs.

Like the parse engine 32, the emit engine 34 manages a set of components with the overall task of outputting a specific program format or directly performing actions that represent the actions requested by each line in a program previously parsed. Like the parse engine 32, the emit engine 34 is not required. If the emit engine 34 is not used, each emitter component 42 is expected to implement all specific emit functionality for a given output type and also to implement all generic functionality normally implemented by the emit engine 34.

Each emitter component 42 is responsible for outputting a specific output format. For example, a GE Fanuc type of emitter component 42 may output a GE Fanuc G&M Code variant. On the other hand, a direct emitter type of emitter component 42 may make direct calls to the XMC Motion Service to carry out the operations requested.

The application programs 22 are each associated with a particular language such as G&M Code files or STEP Code files. G&M Code files are CNC program files based on the EIA-274 ANSI standard format and variants thereof. STEP Code files are STEP program files designed to replace the need for G&M Code Files.

Figure 2:
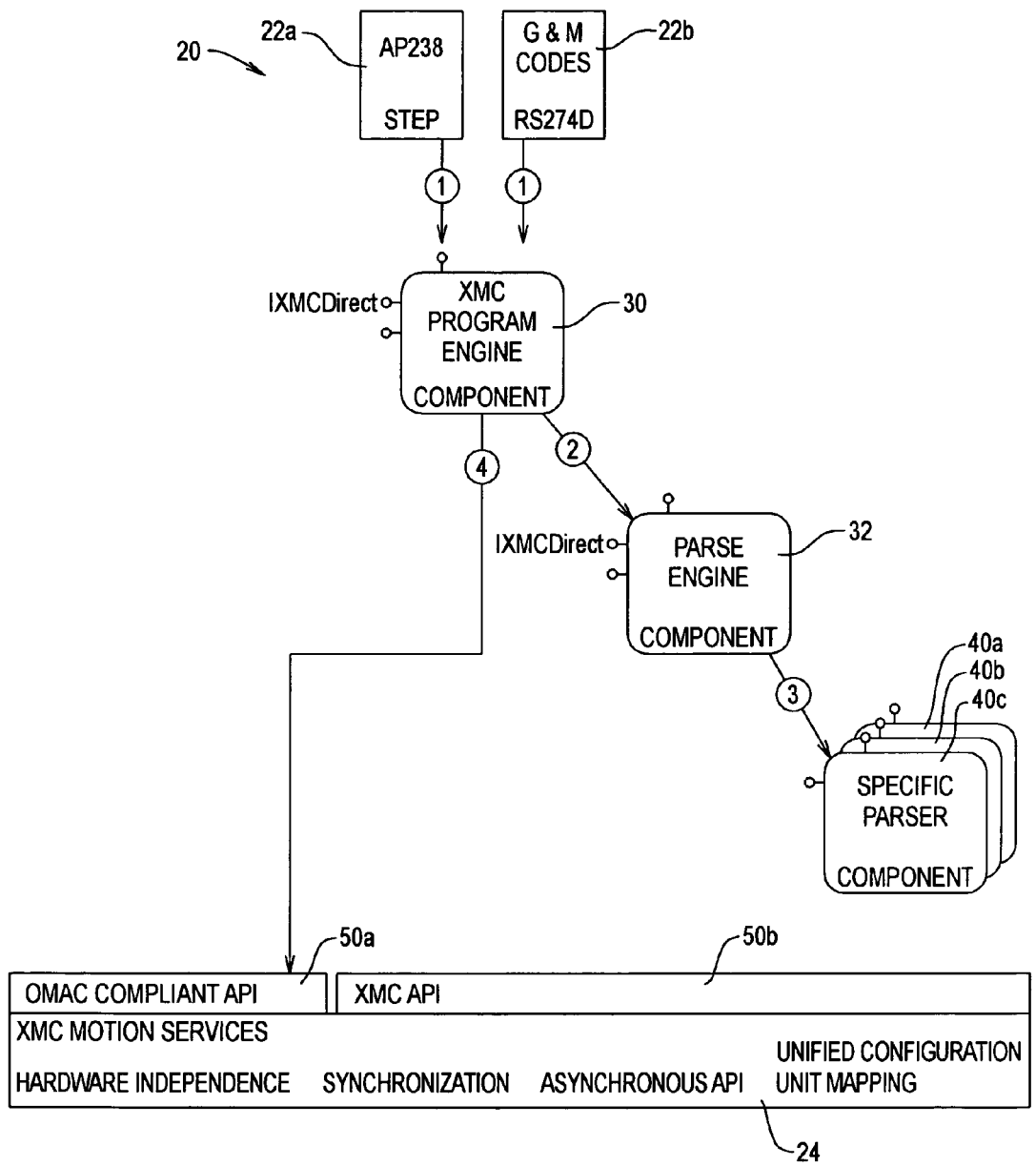
FIGS. 2–4 are scenario maps depicting typical scenarios in which the system of FIG. 1 may be used.

Referring now to FIG. 2, depicted therein is an online run scenario in which the translation system 20 may be used. When programs are run in an online manner, the actions specified in each line of the program are immediately run by the motion services module 24. This mode can be useful when single-stepping and/or testing programs where immediate feedback is needed.

The following steps occur when running a program in the on-line mode. First the source application program or a portion of the program (via a program buffer) is sent to the program engine 30. Next, the program engine 30 directs the parse engine 32 to parse each line of the program (or program buffer). Optionally, a parser component 40 may take over the operations of the parse engine 32. In this case, the program engine 30 would communicate directly to the appropriate parser component 40.

When using the parse engine 32, the parse engine 32 performs all generic operations (such as file management, etc) and passes the data to the parser component 40 in a data buffer for the parser component 40 to parse. During the process, the parser component 40 tokenizes the data and parses out all parameter data into a universal format.

The tokens and universal data format created by the parse engine 32 and parser component 40 are then used by the program engine 30 to direct the XMC Motion Services (via the XMCAPI or OMAC compliant API) to carry out each operation corresponding to each token.

Figure 3:
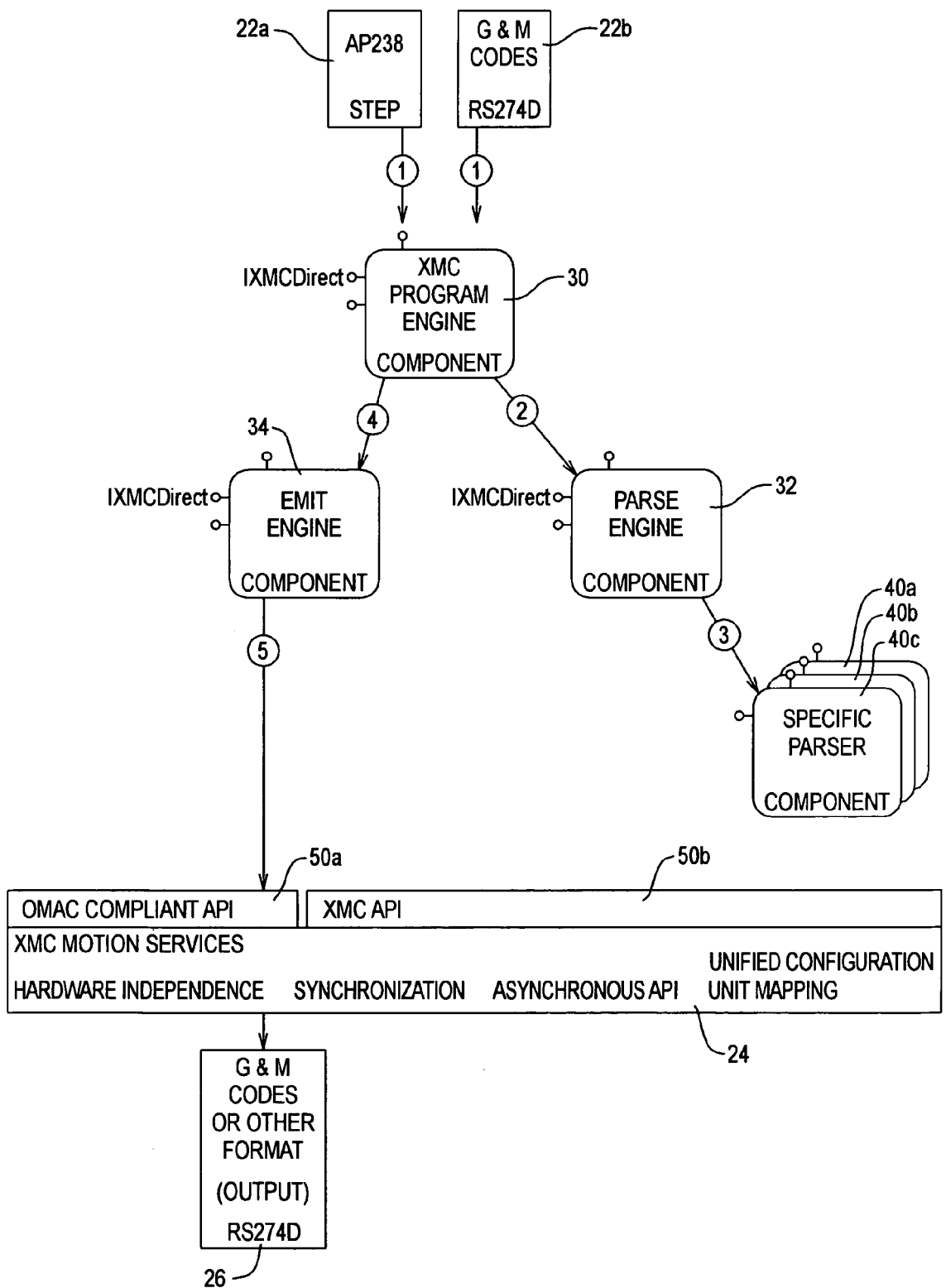

Referring now to FIG. 3, depicted therein is an offline run scenario. When running a program in an offline mode, physical motion may not occur; instead, a target program 26 defining the physical motions that are to take place is created. This new target program 26 is generated based on the specific target driver (not shown) used by the motion services module 24. In addition, the target driver used by the motion services module 24 determines the location of the target program 26. For example, the target program generated may end up residing on the target hardware motion controller in a native program format 'known' by that controller.

The following steps occur when running a program in the on-line mode. First, the source program or a portion thereof is sent (via a program buffer) to the program engine 30. Next, the program engine 30 directs the parse engine 32 to parse each line of the program (or program buffer). As above, one of the optional parser components 40 may take over the operations of the parse engine 32. In this case, the program engine 30 would communicate directly to the parser component 40.

When the parse engine 32 is used, the parse engine 32 performs all generic operations (such as file management, etc) and passes the data to the parser component 40. The data is stored in a data buffer and parsed by the parser component 40. During the process, the parser component 40 tokenizes the data and parses out all parameter data into a universal format. The tokens and universal data format created by the parse engine 32 and parser component 40 are then passed to the emit engine 34 for processing.

When processing the universal tokens, the emit engine 34 first directs the XMC Motion Services to 'Define' a new program or sub-program (for each specified in the universal data). After defining the program (or sub-program) the emit engine 34 calls one of the APIs 50, such as the industry standard first API 50a or the proprietary second API 50b as necessary to perform the actions specified by each token. As described above, the emit component 42 may be used to replace the emit engine 34 and perform specific algorithms (or improvements therein) that the existing emit engine 34 does not perform.

Figure 4:
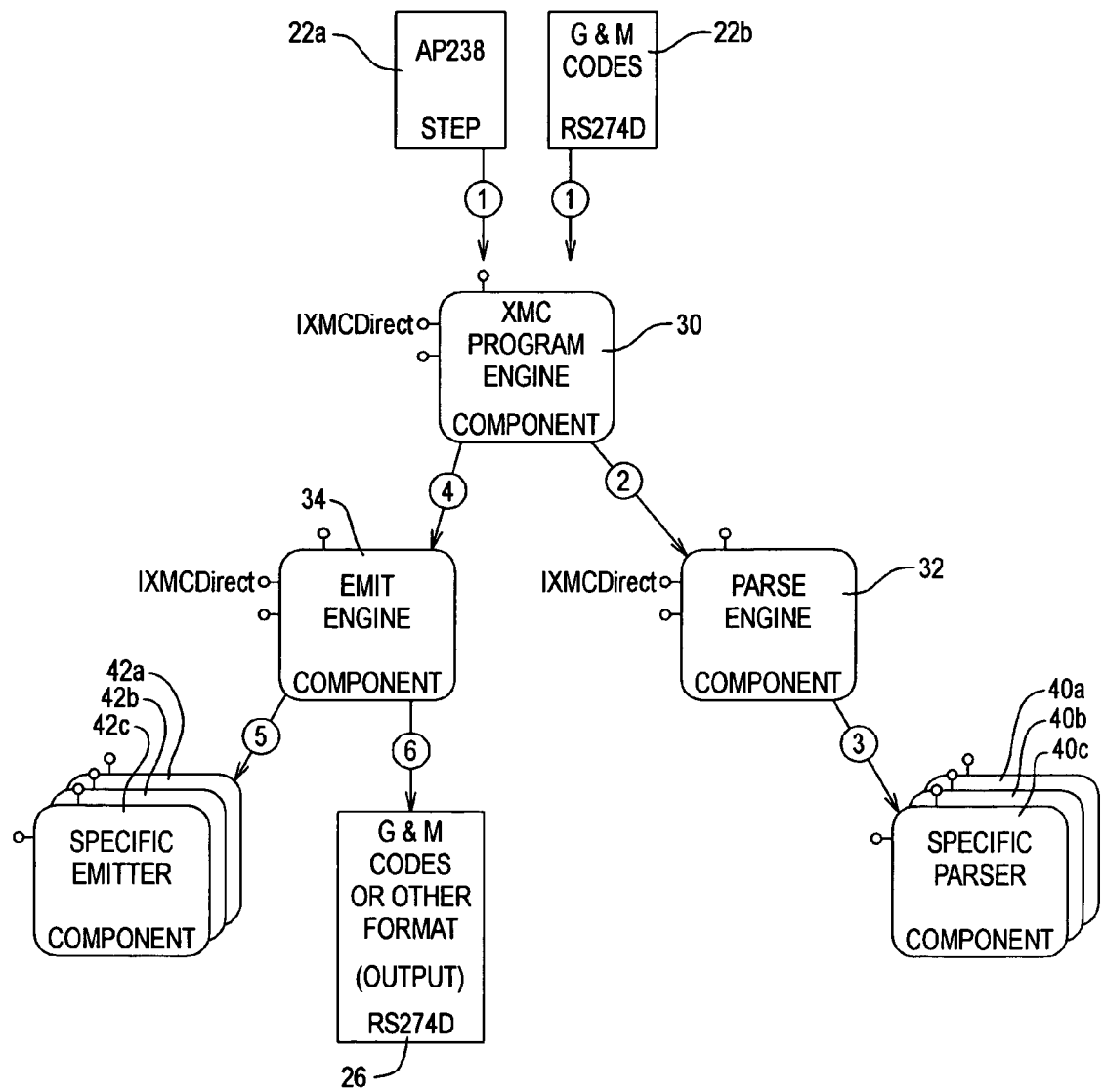

Referring now to FIG. 4, depicted therein is a translation run scenario in which the system 20 may be used. The following steps occur when running a program in the on-line mode. First the source program 22 or a portion thereof is sent (via a program buffer) to the program engine 30. Next, the program engine 30 directs the parse engine 32 to parse each line of the program (or program buffer). As above, an optional parser component 40 may take over the operations of the parse engine 32. In this case, the program engine 30 would communicate directly to the parser component 40.

When using the parse engine 32, the parse engine performs all generic operations (such as file management, etc) and passes the data to the parser component 40 in a data buffer for the parser component 40 to parse. During the process, the parser component 40 tokenizes the data and parses out all parameter data into a universal format. The tokens and universal data format created by the parse engine 32 and parser component 40 are then passed to the emit engine 34 for processing.

When processing the universal tokens, the emit engine 34 directs the emitter component 42 to output each token in the format that it supports. The output information is passed back to the emit engine 34. As above, a specific emit component 42 may be used to replace the emit engine 34 and perform specific algorithms (or improvements therein) that the existing emit engine 34 does not perform.

When the specific data format is received from the emitter component 42, the emit engine 34 then outputs the data buffer to the target data format (i.e. a file, data buffer, or other target). Again, a specific emit component 42 may be used to replace the emit engine 34 and perform specific algorithms (or improvements therein) that the existing emit engine 34 does not perform.

Figure 5:
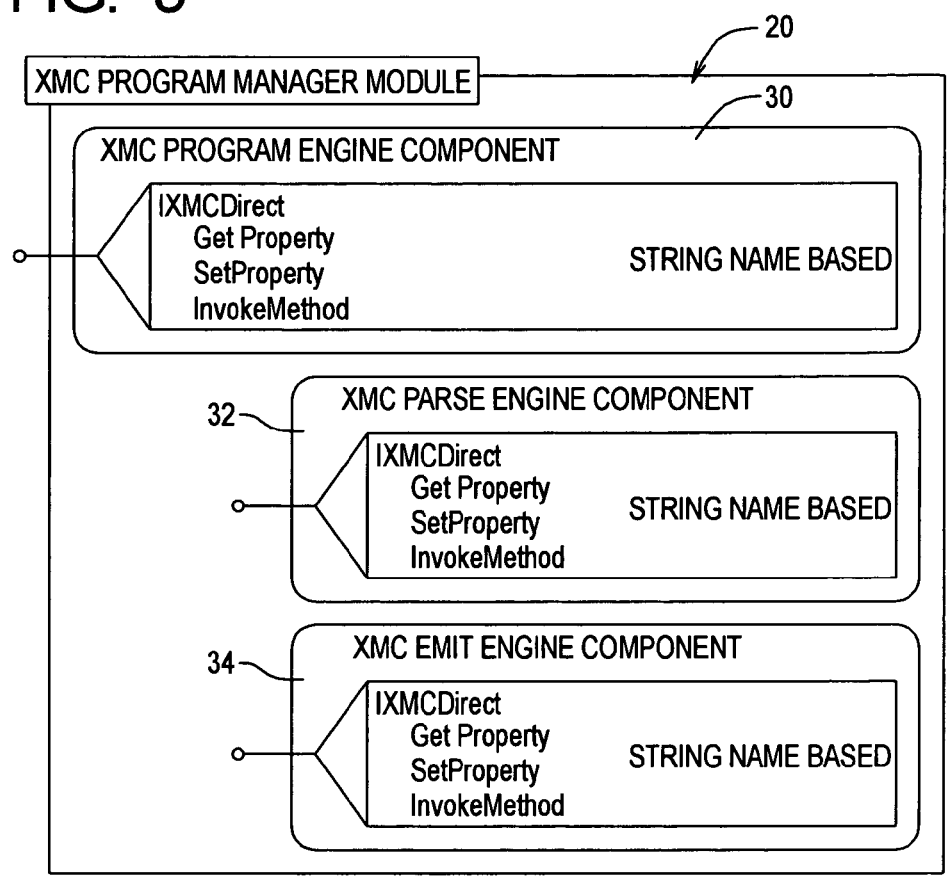
FIG. 5 is a block diagram of a program manager that may be used as part of the software system of FIG. 1.

Referring now to FIG. 5, it can be seen that the translation system 20 exposes one and encapsulates several other components. In the exemplary system 20, these components are based on a component technology such as OLE/COM from Microsoft Corporation. Bundling each object within one module is not required as they may be located at any location (i.e. across a network, and so forth), but doing so optimizes all communication between modules. The following diagram shows an example organization of all components making up the translation system 20, where all are housed within a single module such as a DLL (dynamic link library), executable, .NET package or other binary organization.

In the example above, the program engine 30, parse engine 32 and emit engine 34 are all contained within one module. This organization is not required but optimal for overall performance. The specific parser components 40 and specific emitter components 42 will more than likely be housed in separate binary modules to allow third party support for such modules. Again, the location of each component can vary as the program engine 30 can also implement and house specific parser component 40 and emitter components within the main program module. As shown with both the parser engine 32 and emit engine 34 in the diagram above, all specific parser components 40 and emitter components 42 preferably expose the IXMCDirect interface to allow seamless communications between all other modules.

The IXMCDirect interface is used for most communications between all components making up the program engine 30. The IXMCDirect interface comprises the following methods as specified in the standard OLE/COM IDL format:

GetProperty—This method is used to query a specific property from the component implementing the interface.

SetProperty—This method is used to set a specific property from the component implementing the interface.

InvokeMethod—This method is used to invoke a specific action on the component implementing the interface. It should be noted that an action can cause an event to occur, carry out a certain operation, query a value and/or set a value within the component implementing the method.

A more detailed description of each method implemented by the object is described below.

IXMCDirect::GetProperty:
Syntax HRESULT GetProperty(LPCTSTR pszPropName, LPXMC_PARAM_DATA rgData, DWORD dwCount);
Parameters LPCTSTR pszPropName—string name of the property to query. LPXMC_PARAM_DATA rgData—array of XMC_PARAM_DATA types that specify each parameter corresponding to the property. For example, a certain property may be made up of a number of elements—in this case an array of XMC_PARAM_DATA items is returned, one for each element making up the property. In most cases a property is made up of a single element, thus a single element array is passed to this method. For more information on the XMC PARAM DATA type, see below.
DWORD dwCount—number of XMC_PARAM_DATA elements in the rgData array.
Return Value HRESULT—NOERROR on success, or error code on failure.

The IXMCDirect::GetProperty method is used to query the property corresponding to the property name 'pszPropName'. Each component defines the properties that it supports.

IXMCDirect::SetProperty
Syntax HRESULT SetProperty(LPCTSTR pszPropName, LPXMC_PARAM_DATA rgData, DWORD dwCount);
Parameters LPCTSTR pszPropName—string name of the property to set.
LPXMC_PARAM_DATA rgData—array of XMC_PARAM_DATA types that specify each parameter corresponding to the property. For example, a certain property may be made up of a number of elements—in this case an array of XMC_PARAM_DATA items is returned, one for each element making up the property. In most cases a property is made up of a single element, thus a single element array is passed to this method. For more information on the XMC PARAM DATA type, see below.
DWORD dwCount—number of XMC_PARAM_DATA elements in the rgData array.
Return Value HRESULT—NOERROR on success, or error code on failure.

The IXMCDirect::SetProperty method is used to set a property in the component corresponding to the 'pszPropName' property. For the set of properties supported by the component, see the specific component description.

IXMCDirect::InvokeMethod
Syntax HRESULT InvokeMethod(DWORD dwMethodIdx, LPXMC_PARAM_DATA rgData, DWORD dwCount);
Parameters DWORD dwMethodIdx—number corresponding to the specific method to invoke. For more information on the method indexes available, see the set of namespaces defined for the component.
LPXMC_PARAM_DATA rgData [optional]—array of XMC_PARAM_DATA types that specify each parameter for the method called. For more information on the XMC PARAM DATA type, see below.
NOTE: if no parameters exist for the method called, a value of NULL must be passed in.
DWORD dwCount [optional]—number of XMC_PARAM_DATA elements in the rgData array.
NOTE: if no parameters exist for the method called, a value of 0 (zero) must be passed in for this parameter.
LPXMC_PARAM DATA rgData [optional]—namespace associated with the instance of the custom extension module added.

Return Value HRESULT—NOERROR on success, or error code on failure.

The IXMCDirect::InvokeMethod method is used to call a specific method implemented by the motion services module 24. For more information on the methods supported, see the description of the specific component.

The following discussion describes the specific methods and properties that each component supports.

The program engine 30 component exposes the following properties and methods via the IXMCDirect interface described above.

Property Summary

No properties are specified for this component at this time.

Methods Summary

The following methods are implemented by the program engine 30 component:

SetComponents—used to set specific parser component 40 and emitter components.

SetInputPath—used to set the root path for all programs that do not specify a path in their name.

SetInputProgram—used to set the active program for which the program engine 30 is to process.

SetInputProgramBuffer—used to set a program buffer (as an alternative to setting the program name) for the program engine 30 to process. When setting a program buffer, previous calls to SetProgram are ignored.

SetOutputPath—used to set the root path for all programs that do not specify a path in their name.

SetOutputProgram—used to set the active program for which the program engine 30 is to process.

SetOutputProgramBuffer—used to set a program buffer (as an alternative to setting the program name) for the program engine 30 to process. When setting a program buffer, previous calls to SetProgram are ignored.

SetBreak—used to set a break-point within a program. Break-points are used when running a program with the 'debug' option enabled.

SetInputProgram—returns the name of the program currently set as the active program in the program engine 30.

GetOutputProgram—returns the name of the program currently set as the active program in the program engine 30.

GetState—returns the state of the program engine 30. For example the run state (single step, run, or idle) are returned.

Run—runs a program (and all sub-programs) from star to finish. If the debug option is enabled, the program is run from the current location to the next break point (if one exists) or to the end of the program.

Reset—resets the current location of the program to the beginning of the program.

RemoveBreak—removes a break-point from the program.

RemoveAllBreaks—removes all break-points from the program.

IDX_XMC_PROGENG_SetComponents
Namespace IDX_XMC_NS_PROGENGINE
Syntax IDX_XMC_PROGENG_SetComponents, rgData[], dwCount=2
Parameters rgData[0]—(string) prog-id or CLSID (in string format) of the parser component 40 to use.
  string format) of the emitter component 42 to use. NOTE: if no not present) then the XMC Motion Services are used directly in
Return Val NOERROR on success, or an error code on failure.

The IDX_XMC_PROGENG_SetComponents method is used to set specific parser component 40 and emitter components used to process both input and output data.

IDX_XMC_PROGENG_SetInputPath
Namespace IDX_XMC_NS_PROGENGINE
Syntax IDX_XMC_PROGENG_SetInputPath, rgData[], dwCount=1
Parameters rgData[0]—(string) name of the program path in standard UNC format. Unless otherwise specified in the specific program name, the path specified by this method is used as the root path for all programs.
Return Val NOERROR on success, or an error code on failure.

The IDX_XMC_PROGENG_SetInputPath method is used to set the root path for all programs. Unless a program name already has a path pre-pended to it, the path specified by this method is used to reference all programs and sub-programs.

IDX_XMC_PROGENG_SetInputProgram
Namespace IDX_XMC_NS_PROGENGINE
Syntax IDX_XMC_PROGENG_SetInputProgram, rgData[], dwCount=1
Parameters rgData[0]—(string) name of the program to set as the active program.
Return Val NOERROR on success, or an error code on failure.

The IDX_XMC_PROGENG_SetInputProgram method is used to set the active program that the program engine 30 is to process.

IDX_XMC_PROGENG_SetInputProgramBuffer
Namespace IDX_XMC_NS_PROGENGINE
Syntax IDX_XMC_PROGENG_SetInputProgramBuffer, rgData[], dwCount=2
Parameters rgData[0]—(string) pointer to the string buffer containing the program data.
  rgData[1]—(number) number of characters in the string buffer.
Return Val NOERROR on success, or an error code on failure.

The IDX_XMC_PROGENG_SetInputProgramBuffer method is used to set the active program buffer that the program engine 30 is to process. Any previous calls to SetInputProgram are overridden after making this call.

IDX_XMC_PROGENG_SetOutputPath
Namespace IDX_XMC_NS_PROGENGINE
Syntax IDX_XMC_PROGENG_SetOutputPath, rgData[], dwCount=1
Parameters rgData[0]—(string) name of the program path in standard UNC format. Unless otherwise specified in the specific program name, the path specified by this method is used as the root path for all programs.
Return Val NOERROR on success, or an error code on failure.

The IDX_XMC_PROGENG_SetOutputPath method is used to set the root path for all output programs. Unless a program name already has a path pre-pended to it, the path specified by this method is used to reference all programs and sub-programs.

IDX_XMC_PROGENG_SetOutputProgram
Namespace IDX_XMC_NS_PROGENGINE

Syntax IDX_XMC_PROGENG_SetOutputProgram, rgData[], dwCount=1
Parameters rgData[0]—(string) name of the program to set as the active output program.
Return Val NOERROR on success, or an error code on failure.
The IDX_XMC_PROGENG_SetOutputProgram method is used to set the active output program that the program engine 30 is to create.

IDX_XMC_PROGENG_SetOutputProgramBuffer
Namespace IDX_XMC_NS_PROGENGINE
Syntax IDX_XMC_PROGENG_SetOutputProgramBuffer, rgData[], dwCount=2
Parameters rgData[0]—(string) pointer to the string buffer to be used for program output.
rgData[1]—(number) size of the string buffer.
Return Val NOERROR on success, or an error code on failure.
The IDX_XMC_PROGENG_SetOutputProgramBuffer method is used to set the active output program buffer that the program engine 30 is to process. Any previous calls to SetOutputProgram are overridden after making this call.

IDX_XMC_PROGENG_SetBreak
Namespace IDX_XMC_NS_PROGENGINE
Syntax IDX_XMC_PROGENG_SetBreak, rgData[], dwCount=2
Parameters rgData[0]—(string) program name for the break (i.e. sub-program, or main program).
rgData[2]—(number) line number for the break-point.
Return Val NOERROR on success, or an error code on failure.
The IDX_XMC_PROGENG_SetBreak method is used to set a break-point in either the main program or a sub-program used by the main program.

IDX_XMC_PROGENG_GetInputProgram
Namespace IDX_XMC_NS_PROGENGINE
Syntax IDX_XMC_PROGENG_GetProgram, rgData[], dwCount=1–4
Parameters rgData[0]—(string) the active program name is returned in this parameter.
rgData[1]—(string) [optional] the active sub-program name is returned in this parameter.
rgData[2]—(number) [optional] the current line in the main program is returned in this parameter.
rgData[3]—(number) [optional] the current line in the active sub-program (if any) is returned in this parameter.
Return Val NOERROR on success, or an error code on failure.
The IDX_XMC_PROGENG_GetInputProgram method is used to retrieve the current program and sub-program (if available) names. If a buffer is used instead of a program, a value of "internal buffer" is returned.

IDX_XMC_PROGENG_GetOutputProgram
Namespace IDX_XMC_NS_PROGENGINE
Syntax IDX_XMC_PROGENG_GetOutputProgram, rgData[], dwCount=1–4
Parameters rgData[0]—(string) the active output program name is returned in this parameter.
rgData[1]—(string) [optional] the active output sub-program name is returned in this parameter.
rgData[2]—(number) [optional] the current line in the main output program is returned in this parameter.
rgData[3]—(number) [optional] the current line in the active output sub-program (if any) is returned in this parameter.
Return Val NOERROR on success, or an error code on failure.
The IDX_XMC_PROGENG_GetOutputProgram method is used to retrieve the current output program and sub-program (if available) names. If a buffer is used instead of a program, a value of "internal buffer" is returned.

IDX_XMC_PROGENG_GetState
Namespace IDX_XMC_NS_PROGENGINE
Syntax IDX_XMC_PROGENG_GetState, rgData[], dwCount=1
Parameters rgData[0]—(number:DWORD) the current state of the program engine 30 is returned in this parameter where valid date values are as follows:
XMC_PROGENG_STATE_IDLE—returned when the program engine 30 is not actively processing any programs.
XMC_PROGENG_STATE_RUNNING—returned when the program engine 30 is actively running a program.
XMC_PROGENG_STATE_DEBUG—returned when the program engine 30 is actively running a program and the debug option is enabled.
XMC_PROGENG_STATE_SINGLESTEP—returned when the program engine 30 is actively running a program in the single step mode.
NOTE: other than the 'idle' state, all other states may be bit-wise OR'ed together.
Return Val NOERROR on success, or an error code on failure.
The IDX_XMC_PROGENG_GetState method is used to retrieve the current state of the program engine 30.

IDX_XMC_PROGENG_Run
Namespace IDX_XMC_NS_PROGENGINE
Syntax IDX_XMC_PROGENG_Run, rgData[], dwCount=1
Parameters rgData[0]—(number:DWORD) the current mode for which the program should be run.
XMC_PROGENG_RUNMODE_SINGLESTEP—directs the program engine 30 to only run a single line of the program and then stop.
XMC_PROGENG_RUNMODE_DEBUG—directs the program engine 30 to run in debug mode causing any previously set break-points to take effect. The program is run either up until the next break-point of the end of the program, whichever comes first.
Return Val NOERROR on success, or an error code on failure.
The IDX_XMC_PROGENG_Run method is used to run the active program currently set in the program engine 30.

IDX_XMC_PROGENG_Reset
Namespace IDX_XMC_NS_PROGENGINE
Syntax IDX_XMC_PROGENG_Reset, rgData[]=NULL, dwCount=0
Parameters No parameters
Return Val NOERROR on success, or an error code on failure.
The IDX_XMC_PROGENG_Run method is used to stop running a program and reset the current position in the active program to the beginning of the program.

IDX_XMC_PROGENG_RemoveBreak
Namespace IDX_XMC_NS_PROGENGINE
Syntax IDX_XMC_PROGENG_RemoveBreak, rgData[], dwCount=2

Parameters rgData[0]—(string) program name for the break (i.e. sub-program, or main program).
rgData[2]—(number) line number for the break-point.
Return Val NOERROR on success, or an error code on failure.

The IDX_XMC_PROGENG_RemoveBreak method is used to remove a break-point in either the main program or a sub-program used by the main program.

IDX_XMC_PROGENG_RemoveAllBreaks
Namespace IDX_XMC_NS_PROGENGINE
Syntax IDX_XMC_PROGENG_RemoveAllBreaks, rgData[]= NULL, dwCount=0
Parameters No parameters
Return Val NOERROR on success, or an error code on failure.

The IDX_XMC_PROGENG_RemoveAllBreaks method is used to remove all break-points previously set.

The parser engine component 32 exposes the following properties and methods via the IXMCDirect interface described above.

Property Summary
No properties are specified for this component at this time.

Methods Summary
The following methods are implemented by the parser engine component:
SetInputRoot—This method is used to set the root path to the input data. For example, when parsing file based data, the root is the program path where all programs that do not have pre-pended paths are retrieved from.
SetInput—This method sets the active input data to be parsed.
GetInput—This method retrieves the current input name being parsed.
Step—This method advances the current program position to the next line in the program.
Reset—This method resets the current program position to the start of the active program.
ParseLine—This method parses the current line in the active program and returns a universal set of tokens and parameters that describe the instructions on the current program line.

IDX_XMC_PARSEENG_SetInputRoot
Namespace IDX_XMC_NS_PROGENGINE
Syntax IDX_XMC_PARSEENG_SetInputRoot, rgData[], dwCount=1
Parameters rgData[0]—(string) name of the input path. For example, when using file based programs, a path is specified in standard UNC format. Unless otherwise specified in the specific program name, the path specified by this method is used as the root path for all programs.
Return Val NOERROR on success, or an error code on failure.

The IDX_XMC_PARSEENG_SetInputRoot method is used to set the root path for all programs. Unless a program name already has a path pre-pended to it, the path specified by this method is used to reference all programs and sub-programs.

IDX_XMC_PARSEENG_SetInput
Namespace IDX_XMC_NS_PROGENGINE
Syntax IDX_XMC_PARSEENG_SetInput, rgData[], dwCount=2
Parameters rgData[0]—(number:DWORD) flag specifying the input type. The following input flags are supported:
XMC_PROGENG_INPUT_FILE—specifies that the input type is a file and the following parameter is a filename.
XMC_PROGENG_INPUT_BUFFER—specifies that the input type is a text buffer and the following 2 parameters are the buffer and buffer length.
rgData[1]—(string) name of the program or program buffer depending on the input type.
rgData[2]—(number) size of program buffer (only valid when using the XMC_PROGENG_INFPUT_BUFFER input type).
Return Val NOERROR on success, or an error code on failure.

The IDX_XMC_PARSEENG_SetInput method is used to set the active program, program buffer, or other program source that the parse engine 32 is to process.

IDX_XMC_PARSEENG_GetInput
Namespace IDX_XMC_NS_PROGENGINE
Syntax IDX_XMC_PARSEENG_GetInput, rgData[], dwCount=1
Parameters rgData[0]—(number:DWORD) flag specifying the input type. The following input flags are supported:
XMC_PROGENG_INPUT_FILE—specifies that the input type is a file and the following parameter is a filename.
XMC_PROGENG_INPUT_BUFFER—specifies that the input type is a text buffer and the following 2 parameters are the buffer and buffer length.
rgData[1]—(string) name of the program or program buffer depending on the input type.
rgData[2]—(number) size of program buffer (only valid when using the XMC_PROGENG_INFPUT_BUFFER input type).
Return Val NOERROR on success, or an error code on failure.

The IDX_XMC_PARSEENG_GetInput method is used to retrieve the current program or sub-program (if available) name.

IDX_XMC_PARSEENG_Step
Namespace IDX_XMC_NS_PROGENGINE
Syntax IDX_XMC_PARSEENG_Step, rgData[], dwCount=0–1
Parameters rgData[0] [optional]—(number:DWORD) flags specifying how to make the step operation. Currently this flag is reserved and should be set to 0 (zero).
Return Val S_OK on success, S_FALSE at end of data, or an error code on failure.

The IDX_XMC_PARSEENG_Step method is used to step to the next line in the active program currently set in the parse engine 32.

IDX_XMC_PARSEENG_Reset
Namespace IDX_XMC_NS_PROGENGINE Syntax IDX_XMC_PARSEENG_Reset, rgData[]=NULL, dwCount=0
Parameters No parameters
Return Val NOERROR on success, or an error code on failure.

The IDX_XMC PARSEENG_Reset method is used to reset the current position in the active program to the beginning of the program.

IDX_XMC_PARSEENG_ParseLine
Namespace IDX_XMC_NS_PROGENGINE

Syntax IDX_XMC_PARSEENG_ParseLine, rgData[]=NULL, dwCount=1 to 1024 max
Parameters rgData[0]—(out-number) this out parameter contains the actual number of tokens returned for the line.
rgData[1]—(out-number) this out parameter contains the first token identifier in the set of tokens.
rgData[2]—(out-number) this out parameter contains the number of parameters returned for the first token identifier.
rgData[3]—(out-number) this out parameter contains the first parameter returned for the first token identifier.
NOTE: the patter for element 1–3 continues for all tokens and parameters. For example, a token pattern containing 2 tokens with 1 parameter for the first and 2 parameters for the second would have the following array pattern:
rgData[0]=2 (for 2 tokens)
rgData[1]=token #1 identifier
rgData[2]=token #1 parameter count=1(for 1 parameter)
rgData[3]=token #1 parameter #1
rgData[4]=token #2 identifier
rgData[5]=token #2 parameter count=2 (for 2 parameters)
rgData[6]=token #2 parameter #1
rgData[7]=token #2 parameter #2
Return Val NOERROR on success, or an error code on failure.
The IDX_XMC_PARSEENG_ParseLine method is used to parse the current line into a universal token and associated parameters.

The XMC emit engine component 34 exposes the following properties and methods via the IXMCDirect interface described above.

Property Summary
No properties are specified for this component at this time.

Methods Summary
The following methods are implemented by the emit engine 34 component:
SetOutputRoot—This method is used to set the root path for any data output. For example, when emitting file based data, the root is the program path where all programs that do not have pre-pended paths are created.
SetOutput—This method sets the active output target for emitted data.
GetOutput—This method retrieves the current output name that is emitted to.
EmitLine—This method uses a set of universal tokens and associated parameters to create a line of instructions in the target emitter format.

IDX_XMC_EMITENG_SetOutputRoot
Namespace IDX_XMC_NS_PROGENGINE
Syntax IDX_XMC_EMITENG_SetOutputRoot, rgData[], dwCount=1
Parameters rgData[O]—(string) name of the output path. For example, when using file based programs, a path is specified in standard UNC format. Unless otherwise specified in the specific program name, the path specified by this method is used as the root path for all programs.
Return Val NOERROR on success, or an error code on failure.
The IDX_XMC_EMITENG_SetOutputRoot method is used to set the root path for all programs. Unless a program name already has a path pre-pended to it, the path specified by this method is used to reference all programs and sub-programs.

IDX_XMC_EMITENG_SetOutput
Namespace IDX_XMC_NS_PROGENGINE
Syntax IDX_XMC_EMITENG_SetOutput, rgData[], dwCount=2
Parameters rgData[0]—(number:DWORD) flag specifying the output type. The following input flags are supported:
XMC_PROGENG_OUTPUT_FILE—specifies that the output type is a file and the following parameter is a filename.
XMC_PROGENG_OUTPUT_BUFFER—specifies that the output type is a text buffer and the following 2 parameters are the buffer and buffer length.
rgData[1]—(string) name of the program or program buffer depending on the output type.
rgData[2]—(number) size of program buffer (only valid when using the XMC_PROGENG_OUTPUT_BUFFER output type).
Return Val NOERROR on success, or an error code on failure.
The IDX_XMC_EMITENG_SetOutput method is used to set the active output program, program buffer, or other program source that the emit engine 34 outputs all program data to.

IDX_XMC_EMITENG_GetOutput
Namespace IDX_XMC_NS_PROGENGINE
Syntax IDX_XMC_EMITENG_GetOutput, rgData[], dwCount=1
Parameters rgData[0]—(number:DWORD) flag specifying the output type. The following input flags are supported:
XMC_PROGENG_OUTPUT_FILE—specifies that the output type is a file and the following parameter is a filename.
XMC_PROGENG_OUTPUT_BUFFER—specifies that the output type is a text buffer and the following 2 parameters are the buffer and buffer length.
rgData[1]—(string) name of the program or program buffer depending on the output type.
rgData[2]—(number) size of program buffer (only valid when using the XMC_PROGENG_OUTPUT_BUFFER output type).
Return Val NOERROR on success, or an error code on failure.
The IDX_XMC_EMITENG_GetOutput method is used to retrieve the current program or sub-program (if available) name.

IDX_XMC_EMITENG_EmitLine
Namespace IDX_XMC_NS_PROGENGINE
Syntax IDX_XMC_EMITENG_EmitLine, rgData[]=NULL, dwCount=1 to 1024 max
Parameters rgData[0]—(out-string) this out parameter contains the resulting line of instructions in the native format produced by the emitter.
rgData[1]—(out-number) this out parameter contains size of the output buffer contained in parameter one.
rgData[0]—(in-number) this in parameter contains the actual number of tokens returned for the line.
rgData[1]—(in-number) this in parameter contains the first token identifier in the set of tokens.
rgData[2]—(in-number) this in parameter contains the number of parameters returned for the first token identifier.
rgData[3]—(in-number) this in parameter contains the first parameter returned for the first token identifier.
NOTE: the patter for element 1–3 continues for all tokens and parameters. For example, a token pattern containing 2 tokens with 1 parameter for the first and 2 parameters for the second would have the following array pattern:
rgData[0]=2 (for 2 tokens)
rgData[1]=token #1 identifier
rgData[2]=token #1 parameter count=1 (for 1 parameter)
rgData[3]=token #1 parameter #1
rgData[4]=token #2 identifier
rgData[5]=token #2 parameter count=2 (for 2 parameters)
rgData[6]=token #2 parameter #1
rgData[7]=token #2 parameter #2
Return Val NOERROR on success, or an error code on failure.

The IDX_XMC_EMITENG_EmitLine method is used to emit the current line based on a universal token set and associated parameters.

Each parser component component 40 exposes the following properties and methods via the IXMCDirect interface described above.

Property Summary

No properties are specified for this component at this time.

Methods Summary

The following methods are implemented by each parser component 40 component:
ParseLine—This method parses a single line of instructions and returns a set of universal token identifiers and associated parameters for the line of instructions.

IDX_XMC_PARSEENG_ParseLine
Namespace IDX_XMC_NS_PROGENGINE
Syntax IDX_XMC_PARSEENG_ParseLine, rgData[]=NULL, dwCount=1 to 1024 max
Parameters rgData[0]—(out-number) this out parameter contains the actual number of tokens returned for the line.
rgData[1]—(out-number) this out parameter contains the first token identifier in the set of tokens.
rgData[2]—(out-number) this out parameter contains the number of parameters returned for the first token identifier.
rgData[3]—(out-number) this out parameter contains the first parameter returned for the first token identifier.
NOTE: the patter for element 1–3 continues for all tokens and parameters. For example, a token pattern containing 2 tokens with 1 parameter for the first and 2 parameters for the second would have the following array pattern:
rgData[0]=2 (for 2 tokens)
rgData[1]=token #1 identifier
rgData[2]=token #1 parameter count=1 (for 1 parameter)
rgData[3]=token #1 parameter #1
rgData[4]=token #2 identifier
rgData[5]=token #2 parameter count=2 (for 2 parameters)
rgData[6]=token #2 parameter #1
rgData[7]=token #2 parameter #2
Return Val NOERROR on success, or an error code on failure.

The IDX_XMC_PARSEENG_ParseLine method is used to parse the current line into a universal token and associated parameters.

Each emitter component 42 exposes the following properties and methods via the IXMCDirect interface described above.

Property Summary

No properties are specified for this component at this time.

Methods Summary

The following methods are implemented by each emitter component 42:
EmitLine—This method converts a set of universal tokens and associated parameters into a line of native instructions using the native format supported by the target emitter.

IDX_XMC_EMITENG_EmitLine
Namespace IDX_XMC_NS_PROGENGINE
Syntax IDX_XMC_EMITENG_EmitLine, rgData[]=NULL, dwCount=1 to 1024 max
Parameters rgData[0]—(out-string) this out parameter contains the resulting line of instructions in the native format produced by the emitter.
rgData[1]—(out-number) this out parameter contains size of the output buffer contained in parameter one.
rgData[0]—(in-number) this in parameter contains the actual number of tokens returned for the line.
rgData[1]—(in-number) this in parameter contains the first token identifier in the set of tokens.
rgData[2]—(in-number) this in parameter contains the number of parameters returned for the first token identifier.
rgData[3]—(in-number) this in parameter contains the first parameter returned for the first token identifier.
NOTE: the patter for element 1–3 continues for all tokens and parameters. For example, a token pattern containing 2 tokens with 1 parameter for the first and 2 parameters for the second would have the following array pattern:
rgData[0]=2 (for 2 tokens)
rgData[1]=token #1 identifier
rgData[2]=token #1 parameter count=1 (for 1 parameter)
rgData[3]=token #1 parameter #1
rgData[4]=token #2 identifier
rgData[5]=token #2 parameter count=2 (for 2 parameters)
rgData[6]=token #2 parameter #1
rgData[7]=token #2 parameter #2
Return Val NOERROR on success, or an error code on failure.

The IDX_XMC_EMITENG_EmitLine method is used to emit the current line based on a universal token set and associated parameters.

The following discussion contains the definitions of all special types used by the methods and properties of each component making up the program engine 30.

XMC_PARAM_DATA Structure

All methods exposed by each component in the program engine 30 system use the standard XMC parameters set to describe data used to set and query properties as well as invoke methods. The standard parameters are in the following format:

pObj->InvokeMethod(LPXMC_PARAM_DATA rgData, DWORD dwcount); Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
  LNG_PARAM_DATATYPE adt;
  union
  {
    double df;
    LPTSTR psz;
  };
} XMC_PARAM_DATA;
```

The 'adt' member of the XMC_PARAM_DATA structure describes the data contained within the XMC_PARAM_DATA structure. The values are described below:
LNG_PARAM_DA TA TYPE Description
LNG_ADT_NUMBER Use this value when passing a numerical value via the 'adt' member of the XMC_PARAM_DATA structure.
LNG_ADT_STAT_STRING Use this value when passing a static string value via the 'psz' member of the XMC_PARAM_DATA structure. Static strings do not need to be freed from memory.
LNG_ADT_MEM_STRING Use this value when passing a string value via the 'psz' member of the XMC_PARAM_DATA structure.
  LNG_ADT_MEM_STRING denotes that the string must be freed from memory during cleanup.
LNG_ADT_NOP This value is used to ignore items within the XMC_PARAM_DATA array. When specifies, this parameter is not used.
When querying and setting boolean TRUE/FALSE values, any non-zero value is considered TRUE, whereas a zero value is considered FALSE.

The following discussion contains examples of the three methods that the program engine 30 processes program data: online, offline and translation.

All examples shown in this section (including the online, offline and translation examples) use the same input data. For this reason, the first step of translating the input data to the intermediate universal tokenized data is presented in this section. Each following example, builds on the tokenized data presented in this section for the main difference in each is in how the output data and/or actions are produced.

The following source code is used as the G&M Code ASCII text file input to the program engine 30.
(program filename: "c:\temp\test.cnc")
O0003
N005 G91 G28 X0 Y0 Z0
N010 G54
N015 G90 S1300M03 T02
N020 GOO X1. Y1.
N025 G43H01 Z.1
N030 M08

When processing the input data, the following is an example of the intermediate universal tokens (and associated parameters) that represent the program after it is parsed.

| Input Line | Tokens Generated |
| --- | --- |
| O0003 | rgData[0] = 2 |
|  | rgData[1] = TOK_PROGNAME |
|  | rgData[2] = 1 |
|  | rgData[3] = "O0003" |
|  | rgData[4] = TOK_ENDLINE |
|  | rgData[5] = 0 |
| N005 G91 G28 X0 Y0 Z0 | rgData[0] = 7 |
|  | rgData[1] = TOK_LINEID |
|  | rgData[2] = 1 |
|  | rgData[3] = 5 |
|  | rgData[4] = TOK_MOVE_SETINCMODE |
|  | rgData[5] = 0 |
|  | rgData[6] = TOK_MOVE_TOHOME |
|  | rgData[7] = 1 |
|  | rgData[8] = 3 (use next 3 tokens) |
|  | rgData[9] = TOK_POS_X |
|  | rgData[10] = 1 |
|  | rgData[11] = 0 |
|  | rgData[12] = TOK_POS_Y |
|  | rgData[13] = 1 |
|  | rgData[14] = 0 |
|  | rgData[15] = TOK_POS_Z |
|  | rgData[16] = 1 |
|  | rgData[17] = 0 |
|  | rgData[18] = TOK_ENDLINE |
|  | rgData[19] = 0 |
| N010 G54 | rgData[0] = 3 |
|  | rgData[1] = TOK_LINEID |
|  | rgData[2] = 1 |
|  | rgData[3] = 10 |
|  | rgData[4] = TOK_MOVE_SETZEROPOS |
|  | rgData[5] = 0 |
|  | rgData[18] = TOK_ENDLINE |
|  | rgData[19] = 0 |
| N015 G90 S1300 M03 T02 | rgData[0] = 6 |
|  | rgData[1] = TOK_LINEID |
|  | rgData[2] = 1 |
|  | rgData[3] = 15 |
|  | rgData[4] = TOK_MOVE_SETABSMODE |
|  | rgData[5] = 0 |
|  | rgData[6] = TOK_SPINDLE_SETRATE |
|  | rgData[7] = 1 |
|  | rgData[8] = 1300 |
|  | rgData[9] = TOK_SPINDLE_ON |
|  | rgData[10] = 1 |
|  | rgData[11] = 1 (1 = CW, −1 = CCW) |
|  | rgData[12] = TOK_TOOL_SELECT |
|  | rgData[13] = 1 |
|  | rgData[14] = 2 |
|  | rgData[15] = TOK_ENDLINE |
|  | rgData[16] = 0 |
| N020 G00 X1. Y1. | rgData[0] = 5 |
|  | rgData[1] = TOK_LINEID |
|  | rgData[2] = 1 |
|  | rgData[3] = 20 |
|  | rgData[4] = TOK_MOVE_SETRAPID |
|  | rgData[5] = 0 |
|  | rgData[6] = TOK_POS_X |
|  | rgData[7] = 1 |
|  | rgData[8] = 1 |
|  | rgData[9] = TOK_POS_Y |
|  | rgData[10] = 1 |
|  | rgData[11] = 1 |
|  | rgData[12] = TOK_ENDLINE |
|  | rgData[13] = 0 |
| N025 G43 H01 Z.1 | rgData[0] = 5 |
|  | rgData[1] = TOK_LINEID |
|  | rgData[2] = 1 |
|  | rgData[3] = 25 |
|  | rgData[4] = TOK_OFFSET_TOOL_LEN |
|  | rgData[5] = 1 |
|  | rgData[6] = 1 (use next 1 tokens) |
|  | rgData[7] = TOK_OFFSET_SELECT |
|  | rgData[8] = 1 |
|  | rgData[9] = 1 |
|  | rgData[10] = TOK_POS_Z |
|  | rgData[11] = 1 |
|  | rgData[12] = 0.1 |

-continued

| Input Line | Tokens Generated |
|---|---|
| | rgData[13] = TOK_ENDLINE |
| | rgData[14] = 0 |
| N030 M08 | rgData[0] = 3 |
| | rgData[1] = TOK_LINEID |
| | rgData[2] = 1 |
| | rgData[3] = 25 |
| | rgData[4] = TOK_COOLANT_ON |
| | rgData[5] = 0 |
| | rgData[6] = TOK_ENDLINE |
| | rgData[7] = 0 |

The following pseudo code demonstrates how the program engine 30 is used to convert the input data file shown above into a the intermediate universal tokenized data and associated parameters above.

```
IXMCDirect*    pProgEng;
HRESULT        hr;
XMC_PARAM_DATA rgData[128];
hr = CoCreateInstance(CLSID_ProgEng, . . . ,
           IID_IXMCDirect,
           (LPVOID)&pProgEng);
rgData[0].adt = LNG_ADT_STAT_STRING;
rgData[0].psz = "XMC.PARSER.GCODE.RS274";
hr = pProgEng->InvokeMethod
           (IDX_XMC_PROGENG_SetComponents, rgData, 1);
rgData[0].adt = LNG_ADT_STAT_STRING;
rgData[0].psz = "c:\temp";
hr = pProgEng->InvokeMethod(IDX_XMC_PROGENG_SetInputPath,
           rgData, 1);
rgData[0].psz = "test.cnc";
hr = pProgEng->InvokeMethod
           (IDX_XMC_PROGENG_SetInputProgram, rgData, 1);
rgData[0].adt = LNG_ADT_NUMBER;
rgData[0].df = 0.0;
hr = pProgEng->InvokeMethod(IDX_XMC_PROGENG_Run, rgData,
1);
    Internally, when directed to run the program via the
IDX_XMC_PROGENG_RUN method, the following pseudo code
follows.
IXMCDirect*    m_pParser;
IXMCDirect*    m_pEmitter;
XMC_PARAM_DATA m_rgData[128];
.
.
.
// note, the parser component 40 and emitter are created when the program
engine
// received the _SetComponents call.
//
// In addition, the input root and input program name should have
// already been set during the previous calls to _SetInputPath and
// _SetInputProgram as shown above.
IDX_XMC_PROGENG_RUN - method start
    hr = m_pParser->InvokeMethod(IDX_XMC_PARSEENG_Reset,
           NULL, 0);
    hr = S_OK
    while (hr == S_OK)
    {
        hr = m_pParser->InvokeMethod
               (IDX_XMC_PARSEENG_ParseLine, m_rgData, 128);
        // m_rgData now contains the tokenized data for the current
        // line of data.
        hr = processTokens(m_rgData, 128);
    }
HRESULT processTokens(LPXMC_PARAM_DATA rgData, DWORD
dwCount)
{
    // specific to online, offline or translate modes.
}
```

In the online processing example, a standard RS274D G&M Code ASCII text file is used as input and run using the XMC Motion Services. The same input data presented in the 'Preparation Example' is used for this example and, for that reason, this example will use the same intermediate universal tokenized data shown above.

The following pseudo code represents the actions output (i.e. the motions that occur) when running the input file with the program engine 30.

| Tokens Generated | Pseudo code actions |
|---|---|
| rgData[0] = 2 | No action taken for the program |
| rgData[1] = TOK_PROGNAME | will run immediately in online |
| rgData[2] = 1 | mode. |
| rgData[3] = "O0003" | |
| rgData[4] = TOK_ENDLINE | |
| rgData[5] = 0 | |
| rgData[0] = 7 | |
| rgData[1] = TOK_LINEID | |
| rgData[2] = 1 | |
| rgData[3] = 5 | |
| rgData[4] = TOK_MOVE_SETINCMODE | Set incremental move mode. |
| rgData[5] = 0 | Set MoveToHome action. |
| rgData[6] = TOK_MOVE_TOHOME | |
| rgData[7] = 1 | Set X position for action. |
| rgData[8] = 3 (use next 3 tokens) | |
| rgData[9] = TOK_POS_X | |
| rgData[10] = 1 | Set Y position for action. |
| rgData[11] = 0 | |
| rgData[12] = TOK_POS_Y | |
| rgData[13] = 1 | Set Z position for action. |
| rgData[14] = 0 | |
| rgData[15] = TOK_POS_Z | |
| rgData[16] = 1 | Perform the previous action. |
| rgData[17] = 0 | Wait for action to complete. |
| rgData[18] = TOK_ENDLINE | |
| rgData[19] = 0 | |
| rgData[0] = 3 | |
| rgData[1] = TOK_LINEID | |
| rgData[2] = 1 | |
| rgData[3] = 10 | |
| rgData[4] = TOK_MOVE_SETZEROPOS | Set zero position on all axes. |
| rgData[5] = 0 | |
| rgData[6] = TOK_ENDLINE | |
| rgData[7] = 0 | |
| rgData[0] = 6 | |
| rgData[1] = TOK_LINEID | |
| rgData[2] = 1 | |
| rgData[3] = 15 | |
| rgData[4] = TOK_MOVE_SETABSMODE | Set absolute move mode. |
| rgData[5] = 0 | Set rotation rate for axis |
| rgData[6] = TOK_SPINDLE_SETRATE | designated as the spindle axis. |
| rgData[7] = 1 | Start rotating the spindle axis in |
| rgData[8] = 1300 | CW direction. |
| rgData[9] = TOK_SPINDLE_ON | |
| rgData[10] = 1 | Run the tool-select 'canned' |
| rgData[11] = 1 (1 = CW, -1 = CCW) | program to select tool #2. |
| rgData[12] = TOK_TOOL_SELECT | |
| rgData[13] = 1 | |
| rgData[14] = 2 | |
| rgData[15] = TOK_ENDLINE | |
| rgData[16] = 0 | |
| rgData[0] = 5 | |
| rgData[1] = TOK_LINEID | |
| rgData[2] = 1 | |
| rgData[3] = 20 | |
| rgData[4] = TOK_MOVE_SETRAPID | Set rapid move action. |
| rgData[5] = 0 | Set X position for the action. |
| rgData[6] = TOK_POS_X | |

-continued

| Tokens Generated | Pseudo code actions |
|---|---|
| rgData[7] = 1 | |
| rgData[8] = 1 | Set Y position for the action. |
| rgData[9] = TOK_POS_Y | |
| rgData[10] = 1 | |
| rgData[11] = 1 | Perform the previous action. |
| rgData[12] = TOK_ENDLINE | |
| rgData[13] = 0 | |
| | Set rapid move action (modal state previously set). |
| rgData[0] = 5 | |
| rgData[1] = TOK_LINEID | |
| rgData[2] = 1 | |
| rgData[3] = 25 | |
| rgData[4] = TOK_OFFSET_TOOL_LEN | Select the Z axis offset array. |
| rgData[5] = 1 | |
| rgData[6] = 1 (use next 1 tokens) | Add the tool offset #1 to the Z axis offset array. |
| rgData[7] = TOK_OFFSET_SELECT | |
| rgData[8] = 1 | Set Z position for the action making sure to add all active offsets in the Z axis offset array. |
| rgData[9] = 1 | |
| rgData[10] = TOK_POS_Z | |
| rgData[11] = 1 | |
| rgData[12] = 0.1 | Perform the previous action. |
| rgData[13] = TOK_ENDLINE | |
| rgData[14] = 0 | |
| rgData[0] = 3 | |
| rgData[1] = TOK_LINEID | |
| rgData[2] = 1 | |
| rgData[3] = 25 | |
| rgData[4] = TOK_COOLANT_ON | Run the tool-select 'canned' program to turn the coolant on. |
| rgData[5] = 0 | |
| rgData[6] = TOK_ENDLINE | |
| rgData[7] = 0 | |

When processing the input file, the following communications occur between the program engine 30 and its associated components.

```
//... continued from Process Flow example shown in the Preparation
// Example above.
HRESULT processTokens( LPXMC_PARAM_DATA rgData, DWORD dwCount )
{
  XMC_PARAM_DATA rgParams[128];
  DWORD    dwParams;
  DWORD    dwTokens = (DWORD)rgData[0].df;
  DWORD    dwIdx    = 1;
  DWORD    dwTokenIdx = 0
  while (dwTokenIdx < dwTokens && dwIdx < dwCount)
  {
    dwToken = (DWORD)rgData[dwIdx].df;
    dwIdx += 1;
    dwParams = (DWORD)rgData[dwIdx].df;
    dwIdx += 1;
    for (DWORD dwPdx=0; dwPdx<dwParams && dwPdx<128; dwPdx++)
    {
      rgParams[dwPdx] = rgData[dwIdx+dwPdx];
    }
    dwIdx += dwPdx;
    switch (dwToken)
    {
      case TOK_MOVE_SETINCMODE:
        // store move mode as incremental.
        break;
      case TOK_MOVE_SETABSMODE:
        // store move mode as absolute.
        break;
      case TOK_MOVE_SETRAPID:
        // store move action as rapid.
        break;
      case TOK_MOVE_TOHOME:
        // set move action to move home
        break;
      case TOK_POS_X:
        // store X position.
        break;
      case TOK_POS_Y:
        // store Y position.
        break;
      case TOK_POS_Z:
        // store Z position.
        break;
      case TOK_MOVE_SETZEROPOS:
        // set action to set the zero axis.
        break;
      case TOK_SPINDLE_SETRATE:
        // store the spindle value as velocity (or rotation) for
        // the axis designated as the spindle axis.
        break;
      case TOK_SPINDLE_ON:
        // set action as 'run program'.
        // set target caned program to 'spindle_on'.
        break;
      case TOK_TOOL_SELECT:
        // set action as 'run program'.
        // set target canned program to 'tool_select'.
        break;
      case TOK_OFFSET_TOOL_LEN:
        // Set active offset array to Z axis and if any
        // offsets are in the pending queue, add them to the
        // offset array and clear them from the queue.
        break;
      case TOK_OFFSET_SELECT:
        // Add selected offset to active offset array, and if
        // no offset array is active, add to pending offset queue.
        break;
      case TOK_COOLANT_ON:
        // set action as 'run program'.
        // set target canned program to 'coolant_on'.
        break;
      case TOK_ENDLINE:
        // perform the action previously stored using the stored
        // positions, offsets and/or program names (to run) as
        // appropriate.
        break;
    }
  }
}
```

The offline example is similar to the on-line example. The major difference between these examples is that, when the program name token is received (TOK_PROGNAME), the program engine 30 directs the XMC Motion Services to 'Define' a program using the given program name. In addition, just after processing the final token, the program engine 30 directs the XMC Motion Services to 'End' the program thus creating a new program on the current motion target used by the XMC Motion Services. For more information on defining and ending motion programs, see the XMC C++ Reference documentation contained within the XMC for Visual Studio product.

When running in translation mode, the universal tokens and associated parameters are passed to the emit engine 34 that uses the tokens to create a new program output based on the target emitter used. The following pseudo code demonstrates how the program engine 30 is used to convert the intermediate universal tokenized data and associated parameters above into a newly formatted output program file.

```
IXMCDirect* pProgEng;
HRESULT    hr;
XMC_PARAM_DATA rgData[128];
```

-continued

```
hr = CoCreateInstance( CLSID_ProgEng, ...,
       IID_IXMCDirect,
       (LPVOID)&pProgEng);
rgData[0].adt = LNG_ADT_STAT_STRING;
rgData[0].psz = "XMC.PARSER.GCODE.RS274";
rgData[1].adt = LNG_ADT_STAT_STRING;
rgData[1].psz = "XMC.EMITTER.GCODE.OKUMA";
hr = pProgEng->InvokeMethod( IDX_XMC_PROGENG_
       SetComponents, rgData, 1 );
rgData[0].adt = LNG_ADT_STAT_STRING;
rgData[0].psz = "c: emp";
hr = pProgEng->InvokeMethod( IDX_XMC_PROGENG_
       SetInputPath, rgData, 1 );
hr = pProgEng->InvokeMethod( IDX_XMC_PROGENG_
       SetOutputPath, rgData, 1 );
rgData[0].psz = "test.cnc";
hr = pProgEng->InvokeMethod( IDX_XMC_PROGENG_
       SetInputProgram, rgData, 1 );
  rgData[0].psz = "newtest.min";
  hr = pProgEng->InvokeMethod( IDX_XMC_PROGENG_
       SetOutputProgram, rgData, 1 );
  rgData[0].adt = LNG_ADT_NUMBER;
  rgData[0].df = 0.0;
  hr = pProgEng->InvokeMethod( IDX_XMC_PROGENG_Run,
  rgData, 1 );
       Internally, when directed to run the program via the
IDX_XMC_PROGENG_Run method, the following pseudo code
follows.
    IXMCDirect* m_pParser;
    IXMCDirect* m_pEmitter;
    XMC_PARAM_DATA m_rgData[128];
    :
    // note, the parser component 40 and emitter are created when the
    program engine
    // received the_SetComponents call.
    //
    // In addition, the input root and input program name should have
    // already been set during the previous calls to_SetInputPath,
    // _SetOutputPath,_SetInputProgram and_SetOutputProgram.
    IDX_XMC_PROGENG_Run – method start
    hr = m_pParser->InvokeMethod( IDX_XMC_PARSEENG_
    Reset, NULL, 0 );
    hr = S_OK
    while (hr == S_OK)
    {
       hr = m_pParser->InvokeMethod( IDX_XMC_PARSEENG_
           ParseLine, m_rgData, 128 );
       // m_rgData now contains the tokenized data for the current
       // line of data.
       hr = m_pEmitter->InvokeMethod( IDX_XMC_EMITENG_
           EmitLine, M_rgData, 128 );
    }
```

Using the universal tokens, the emitter converts the tokens into the appropriate output corresponding to the format supported by the emitter. For example, in the example above, the Okuma emitter would output a MIN file in the Okuma variant of the G-Code language.

The translator system 20 described above is designed to translate one type of program format to another type of program format where a program format can be either an off-line program format or an online format where a driver is called immediately as the program is translated. In another example a one-program format may be translated into a universal 'meta' format that is hardware independent yet supported by the motion services module 24. In particular, when the meta format is run the format is interpreted into direct calls into the motion services module which are then run on the current driver.

Figure 6:
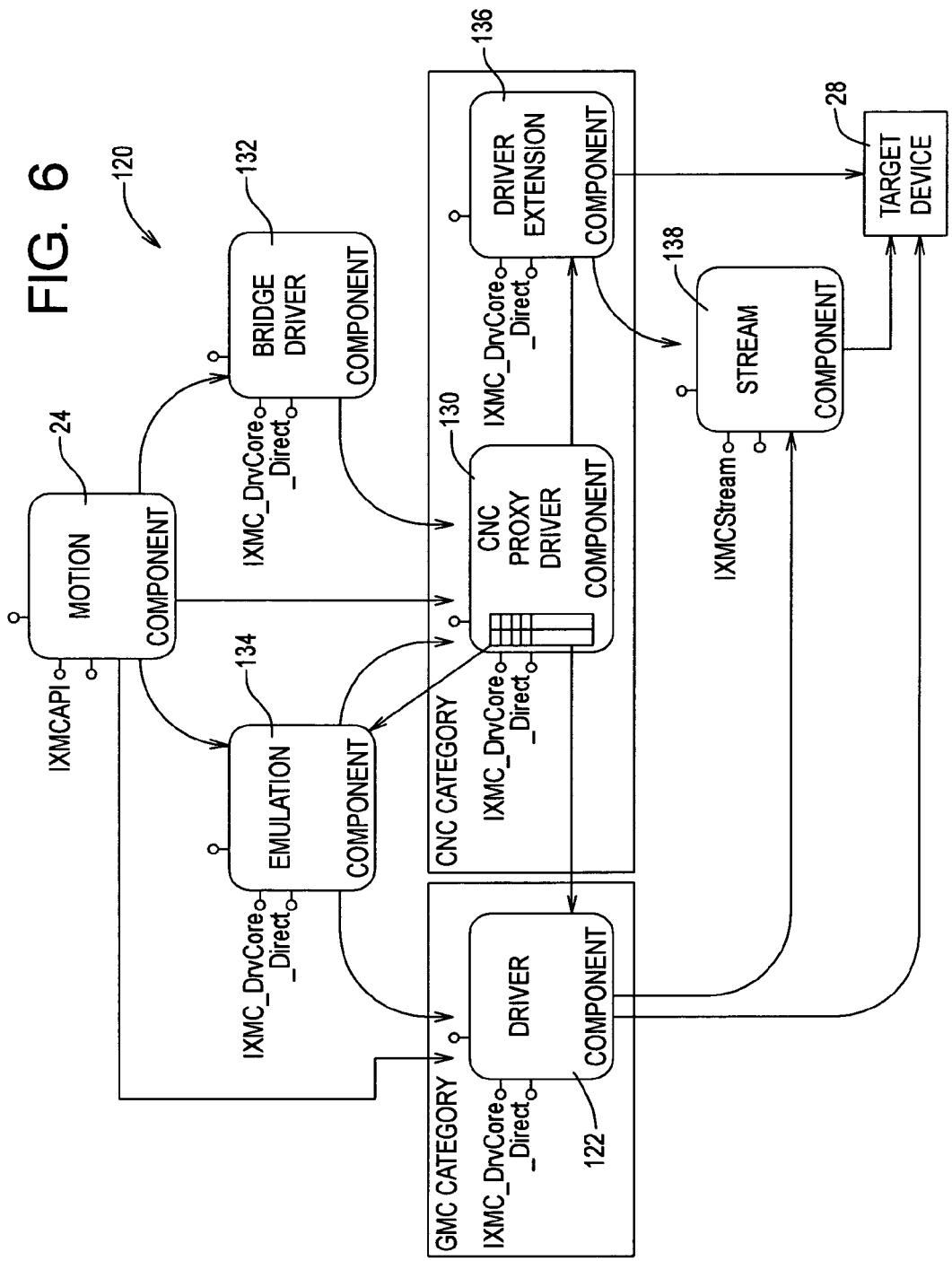
FIG. 6 is a module interaction map of an optional CNC proxy driver system constructed in accordance with the principles of the present invention.

Referring now to FIG. 6, depicted therein is example of a CNC proxy system 120 constructed in accordance with, and embodying, the principles of the present invention. As shown, the CNC proxy system 120 is preferably used in conjunction with the motion services module 24 as described above. In addition, the motion services module 24 is preferably used in conjunction with the translator system 20 as described above. The CNC proxy system 120 may, however, be used without either the motion services module 24 or the translator system 20. As shown, the CNC proxy system 120 may be arranged between the motion services module 24 and the target device 28.

The CNC proxy system 120 is used to map CNC functionality onto a general motion control driver 122. When used with the translator system 20 and the motion services module 24, the CNC proxy system 120 supports translated programs that use CNC functionality. For example, feedrate override, spindlerate, etc are functions that are not normally supported by general motion controllers. To allow the translator system 20 to run on a motion services module 24 connected to a general motion system, the CNC proxy system 120 handles the required mapping between CNC functionality and the general motion functionality provided by a general motion controller functioning as the target device 28.

As shown in FIG. 6, the CNC proxy system 120 comprises a CNC proxy driver component 130. The CNC proxy system further optionally comprises one or more of a bridge driver component 132, an emulation component 134, a driver extension component 136, and a stream component 138.

The CNC proxy driver component 130 is the main module used to make the link between a CNC system and a general motion controller. CNC functions are very specific to the types of operations that occur on a CNC machine, and a General Motion Controller applies to a very broad set of applications. The CNC proxy driver component 130 comprises a set of special algorithms and mapping to allow the use of a general motion controller to implement a CNC based solution.

The emulation driver component 134 is an optional component used to emulate driver operations and defines a broader set of motion functionality that, when combined with the native motion driver, provides the client application 22 with access to a richer set of motion functionality.

The bridge driver component 132 is an optional component used to handle all common driver functionality. The bridge driver component 132 thus makes each target driver 122 very simple and focused primarily on performing the motion operations implemented by the target device 28 or general motion controller (including software, hardware and even remote or network based motion controllers).

The driver component 122 is the native motion control driver that embodies the native motion controller language (or API calls) needed to control the target motion control system.

The exemplary CNC proxy driver component 130 is a module that implements the XMCCNC API function calls and uses internal algorithms to map those CNC operations to the functionality provided by the target driver 122 and/or the emulation driver 134. For example, the feedrate of a toolhead may be calculated using the actual velocities along three axes in three space. When queried, the XMC CNC Proxy Driver would first query the target driver for the actual velocity along the three axes, then calculate the feedrate and return the calculated value.

The driver extension component 136 is an optional component that allows third parties to expand the functionality of the CNC proxy driver component 130 with custom algorithms.

The stream component 138 is an optional component that encapsulates how a driver 122 communicates with the target motion hardware. Optionally, the driver component 122 may handle all communication with the target motion system, therefore eliminating the need for the stream component 138.

The CNC proxy system 120 is used in several common scenarios. When the proxy system 120 is first used, it must be initialized. Once initialized, CNC operations (functions or properties) are performed on the overall motion system. The following sections describe these scenarios in detail.

Figure 7:
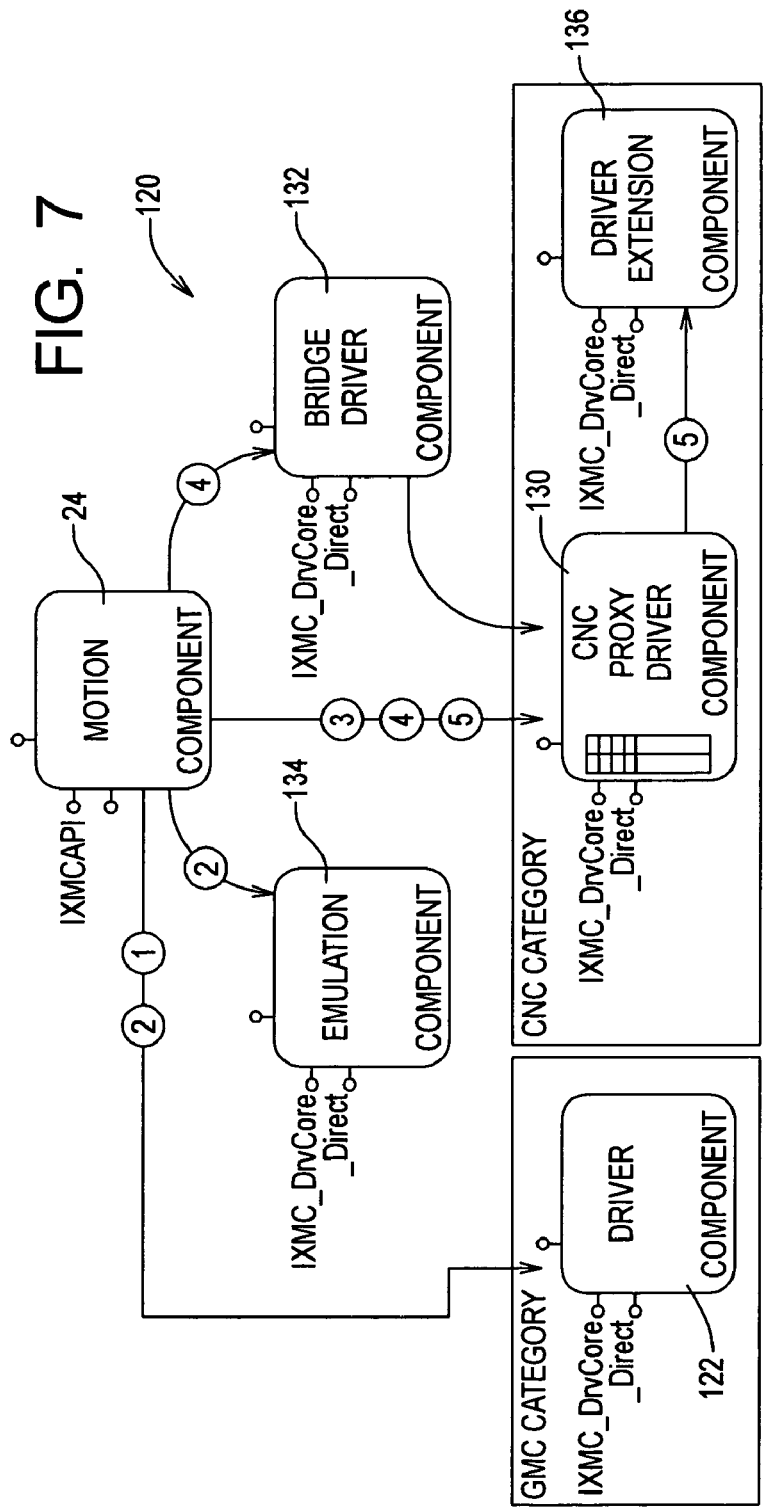
FIGS. 7–8 are scenario maps depicting typical scenarios in which the system of FIG. 6 may be used.

Referring now to FIG. 7, when initializing the system, the link between the CNC functionality provided by the CNC proxy system 120 and the target general motion controller is made. The following steps occur when initializing the CNC proxy system 120.

First, the motion services module 24 queries the target driver 122 for information describing the Service Provider Interface (SPI) support that the driver 122 implements. When queried, the driver 122 returns a table of information describing whether each function in the SPI is implemented, should be emulated, or is not supported.

Next, the motion services module 24 builds an internal Service Provider Interface table that contains pointers to all functions making up the SPI. Depending on how the target driver implements each SPI, a pointer in the table either points to the SPI function implemented by the Driver (when the driver implements the function) or the Emulation component (when the driver does not implement or requests emulation of the function).

Next, the motion services module 24 passes the SPI function table to the CNC proxy driver component 130; the CNC proxy driver component 130 later uses the SPI function table when mapping the CNC functions and properties to the general motion functionality.

Next the motion services module 24 initializes the bridge driver 132 and passes a pointer to the CNC proxy driver component 130 a general proxy. And finally, any existing driver extension modules 136 are created and registered with the CNC proxy driver component 130.

Figure 8:
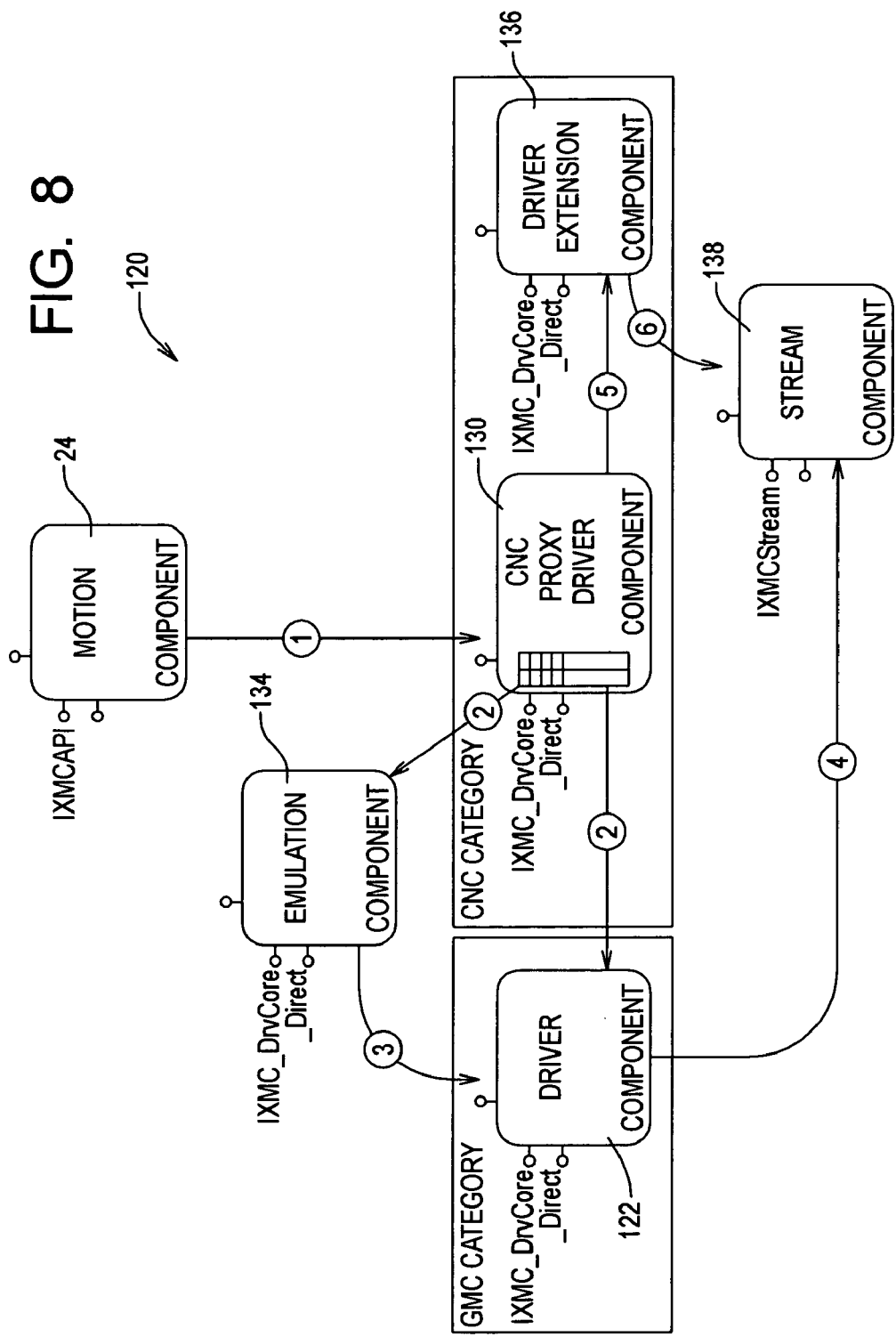

Once initialized, the entire system is ready to perform CNC operations as shown in FIG. 8. When performing each operation, all requests are first routed to the CNC proxy driver component 130. The CNC proxy driver component 130 then uses internal algorithms to map each requested operation to the specific general motion control functionality provided by the target driver 122 and by the functionality provided by the emulation component 134.

The following steps occur when performing a CNC operation on the XMC system. When the client application 22 requests any CNC type operations from the motion services module 24, the motion services module 24 in-turn directs the calls to the CNC proxy driver component 130. Upon receiving the request, the CNC proxy driver component 130 uses the SPI function table, which points to either emulation component 134 or the SPI functions implemented by the driver component 122, to perform general motion operations needed to carry out the requested CNC operation.

If the SPI function called is implemented by the emulation component 134, the emulation component 134 in-turn uses the target driver 122 to carry out the general motion operation or operations that emulate the CNC operation.

When requested to perform general motion operations, the driver component 122 performs any language translations (or direct memory access operations, or API calls) necessary to perform the general motion operation. If used, the stream component 138 allows communication with the target motion system. If the stream component 138 is not used, the driver component 122 may optionally directly communicate with the target motion system 28.

In the event that the CNC proxy driver component 130 does not implement the CNC operation requested, the request is routed to any registered driver extension modules 136 to give them a chance to perform the requested operation. The driver extension modules 136 are normally used when a third party implements additional CNC functionality not supported by the current CNC operations. Upon receiving the request, the driver extension component 136 can optionally use the stream component 138 to communicate with the target motion control system. As another alternative, the driver extension 136 may also talk directly to the target motion system 28.

All driver level modules other than the General Driver Proxy, are required to implement the IXMC_DrvCore_Direct interface. Most communications between drivers occur through this interface.

The IXMC_DrvCore_Direct interface is used for most communications between all driver level components. The following methods make up this interface (as specified in the standard OLE/COM IDL format):

Method Summary

The IXMC_DrvCore_Direct interface is made up of the following functions.

SetTargetStream—This method is used to set the target stream on the driver.

InvokeMethod—This method is used to invoke methods on the driver implementing the SPI function set.

A more detailed description of each method implemented by the object is described below.

IXMC_DrvCore_Direct::SetTargetStream

Syntax HRESULT SetTargetStream(IXMC_Stream* pStrm);

Parameters IXMC_Stream* pStrm—pointer to the target stream used by all drivers.

Return Value HRESULT—NOERROR on success, or error code on failure.

The IXMC_DrvCore_Direct::SetTargetStream method is used to set the target stream on the component implementing this method.

IXMC_DrvCore_Driver::InvokeMethod

Syntax HRESULT InvokeMethod(DWORD dwSPIIdx, LPXMC_PARMA_DATA rgData, DWORD dwCount);

Parameters DWORD dwSPIIdx—index of the function to run on the driver.

LPXMC_PARAM_DATA rgData—array of XMC_PARAM_DATA types that specify each parameter corresponding to the function. For more information on the XMC PARAM DATA type, see below.

DWORD dwCount—number of XMC_PARAM_DATA elements in the rgData array.

Return Value HRESULT—NOERROR on success, or error code on failure.

The IXMC_DrvCore_Driver::InvokeMethod method is used to run a method on the component implementing the method.

The following discussion describes special algorithms used when mapping the CNC functionality to the general motion driver used to eventually implement portions of the CNC functionality.

Function mapping is an important concept used to make the link between the CNC proxy driver component 130 and the target motion control driver and emulation modules. When making this link, the motion services component 24 passes to the CNC proxy driver component 130 a function table with entries that correspond to each of the functions in the general motion SPI. This table is used to access each general motion function, which are then used by the implementation of the CNC operations.

Figure 9:
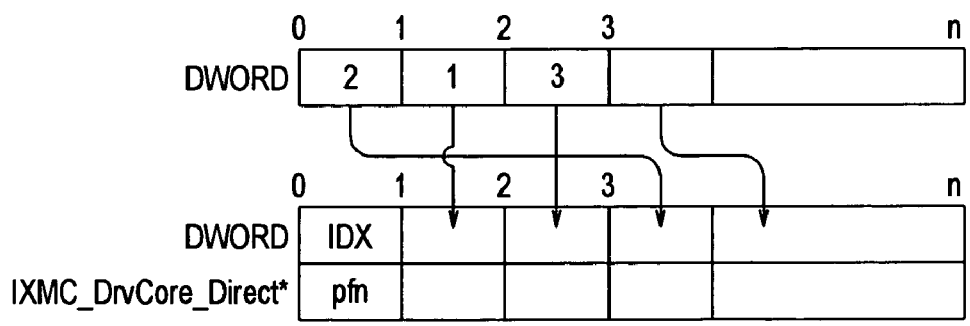
FIG. 9 is a diagram depicting function mapping between CNC operations and general motion functions.

Referring now to FIG. 9, the function table containing entries that correspond to each of the functions in the general motion SPI will now be described in further detail. The table passed to the CNC Proxy is made up of entries that contain, as shown in FIG. 9, both the SPI function index and a pointer to the IXMC_DrvCore_Direct interface on the module that actually implements the function.

```
XMC_SPI_FNTABLE_ENTRY Structure
Syntax    typedef struct_XMC_SPI_FNTABLE_ENTRY
          {
          DWORD         dwFnIdx;
          IXMC_DrvCore_Direct* pDirect;
          } XMC_SPI_FNTABLE_ENTRY;
Field     DWORD dwFnIdx - index of the function to run on the
          module pointed to by the pDirect interface pointer.
          IXMC_DrvCore_Direct* pDirect - pointer to the module
          implementing the IXMC_DrvCore_Direct interface.
          Depending on whether or not the native driver supports the
          function specified by the dwFnIdx field, this pointer will
          either point to the Emulation module or the native driver.
```

The XMC_SPI_FNTABLE_ENTRY structure defines each entry in the SPI table passed to the CNC proxy driver component 130.

When first initialized, the CNC proxy driver component 130 is sent the SPI table so that this table can be used later when running CNC type operations. To initialize the CNC proxy driver component 130, the table is passed to the CNC Proxy by the Motion component through an array of XMC_PARAM_DATA elements. The following source code sample demonstrates pseudo code of the initialization process.

```
class CNCProxyImpl
{
public:
CNCProxyImpl(void);
HRESULT InvokeMethod( . . . );
private:
LPXMC_SPI_FNTABLE_ENTRY m_rgSPITable;
DWORD       m_dwSPITableCount;
};
.
.
.
HRESULT CNCProxyImpl::InvokeMethod(DWORD dwSPIIdx,
LPXMC_PARAM_DATA rgData,
DWORD dwCount,
DWORD dwFlags)
{
if (dwSPIIdx == IDX_XMC_CNCPROXY_INITIALIZE)
{
LPXMC_SPI_FNTABLE_ENTRY rgSPITable;
DWORD       dwSPITableCount;
if (rgData[0].adt != LNG_ADT_STAT_STRING ||
rgData[1].adt != LNG_ADT_NUMBER)
return(E_INVALIDARG);
rgSPITable    = (LPXMC_SPI_FNTABLE_ENTRY)rgSPITable.psz;
dwSPITableCount = (DWORD)rgSPITableCount.df;
m_rgSPITable                                    = new
XMC_SPI_FNTABLE_ENTRY[dwSPITableCount];
m_dwSPITableCount = dwSPITableCount;
for (DWORD dwIdx=0; dwIdx<dwSPITableCount; dwIdx++)
{
m_rgSPITable[dwIdx].dwSPIIdx = rgSPITable[dwIdx].dwSPIIdx;
```

```
-continued m_rgSPITable[dwIdx].pDirect = rgSPITable[dwIdx].pDirect;
if (m_rgSPITable[dwIdx].pDirect != NULL)
m_rgSPITable[dwIdx].pDirect->Add Ref( );
}
}
return(NOERROR);
}
```

Once the CNC proxy driver component 130 is initialized, it will hold a copy of the full SPI Table containing all SPI functions implemented by either the target Driver or Emulation component.

Once the CNC proxy driver component 130 is initialized it is ready to perform CNC operations. When performing CNC operations, the CNC proxy driver component 130 uses the functions pointed to by the entries of the SPI Table to complete the CNC operations requested. The following example, demonstrates how to call methods contained within the XMC SPI function table.

```
//NOTE: m_rgSPITable is defined by the class, see above source.
.
.
.
HRESULT CNCProxyImpl::InvokeMethod(DWORD dwSPIIdx,
LPXMC_PARAM_DATA rgData,
DWORD dwCount,
DWORD dwFlags)
{
if(dwSPIIdx == IDX_XMC_CNCPROXY_FEEDRATE)
{
XMC_PARAM_DATA rgSpiData[3];
HRESULT       hr;
DWORD         dwFnIdx =
IDX_XMC_GENERALMOTION_GET_VELOCITY;
double         dfFeed = 0;
hr = m_rgSPITable[dwFnIdx]->InvokeMethod(dwFnIdx,
rgSpiData,
3,
0);
if (FAILED(hr))
return(hr);
dfFeed = rgData[0].df * rgData[0].df +
rgData[1].df * rgData[1].df +
rgData[2].df * rgData[2].df;
dfFeed = _sqrt(dfFeed);
rgData[0].adt = LNG_ADT_NUMBER;
rgData[0].df = dfFeed;
}
return(NOERROR);
}
```

The following discussion contains the definitions of all special types used by the methods and properties of each component making up the program engine 30 system.

All methods exposed by each component in the system 120 use the standard XMC parameters set to describe data used to set and query properties as well as invoke methods. The standard parameters are in the following format: pObj->InvokeMethod (LPXMC_PARAM_DATA rg Data, DWORD dwCount);

Each element in the rgData array corresponds to a parameter, with the first element in the array corresponding to the first parameter.

The XMC_PARAM_DATA structure can contain either a numerical or a string value and is defined as follows:

```
typedef struct tagXMC_PARAM_DATA
{
LNG_PARAM_DATATYPE adt;
union
{
double df;
LPTSTR psz;
}XMC_PARAM_DATA;
```

The 'adt' member of the XMC_PARAM_DATA structure describes the data contained within the XMC_PARAM_DATA structure. The values are described below:

| LNG_PARAM_DATATYPE | Description |
| --- | --- |
| LNG_ADT_NUMBER | Use this value when passing a numerical value via the 'adt' member of the XMC_PARAM_DATA structure. |
| LNG_ADT_STAT_STRING | Use this value when passing a static string value via the 'psz' member of the XMC_PARAM_DATA structure. Static strings do not need to be freed from memory. |
| LNG_ADT_MEM_STRING | Use this value when passing a string value via the 'psz' member of the XMC_PARAM_DATA structure. LNG_ADT_MEM_STRING denotes that the string must be freed from memory during cleanup. |
| LNG_ADT_NOP | This value is used to ignore items within the XMC_PARAM_DATA array. When specifies, this parameter is not used. |

When querying and setting boolean TRUE/FALSE values, any non-zero value is considered TRUE, whereas a zero value is considered FALSE.

The invention claimed is:

1. A motion control system comprising:
   a source application program defined by a source language specification;
   a target device that creates motion under control of application programs defined by a target language specification;
   a parser component containing logic for converting application programs defined by the source language specification into a first format;
   an emitter component containing logic for converting application programs in the first format into application programs defined by a second format, where the second format is an interpreted language;
   a program engine component for
      directing the parser component to convert the source application program into a first application program, and
      directing the emitter component to convert the first application program into a second application program defined by the second format; and
   a parser interface that defines communications between the parser component and the program engine component.

2. A motion control system as recited in claim 1, in which the second format conforms to the target language specification, where the target device creates motion based on the second application program in the second format.

3. A motion control system as recited in claim 1, further comprising a motion component for converting application programs in the second format into application programs conforming to the target language specification, where the motion component converts the second application program into a target application program conforming to the target language specification.

4. A motion control system as recited in claim 3, in which the target device creates motion based on the target application program.

5. A motion control system as recited in claim 1, further comprising:
   a plurality of target language specifications; and
   a plurality of emit components, where each emit component is associated with one of the target language specifications.

6. A motion control system as recited in claim 5, further comprising an emit engine that performs a first set of emit functions, where the emit components each perform a second set of emit functions specific to the target language specification associated therewith.

7. A motion control system as recited in claim 1, further comprising:
   a plurality of source language specifications; and
   a plurality of parser components, where each parser component is associated with one of the source language specifications.

8. A motion control system as recited in claim 7, further comprising a parser engine that performs a first set of parse functions, where the parser components each perform a second set of parse functions specific to the source language specification associated therewith.

9. A motion control system as recited in claim 7, further comprising:
   a plurality of target language specifications; and
   a plurality of emit components, where each emit component is associated with one of the target language specifications.

10. A motion control system as recited in claim 9, further comprising a parser engine that performs a first set of parse functions, where the parser components each perform a second set of parse functions specific to the source language specification associated therewith.

11. A motion control system as recited in claim 10, further comprising a emit engine that performs a first set of emit functions, where the emit components each perform a second set of emit functions specific to the target language specification associated therewith.

12. A motion control system as recited in claim 1, further comprising a parser engine that performs a first set of parse functions, where the parser component performs a second set of parse functions specific to the source language specification.

13. A motion control system as recited in claim 12, further comprising an emit engine that performs a first set of emit functions, where the emit component performs a second set of emit functions specific to the target language specification.

14. A motion control system as recited in claim 1, further comprising an emit engine that performs a first set of emit functions, where the emit component performs a second set of emit functions specific to the target language specification.

* * * * *